(12) United States Patent
Noguchi et al.

(10) Patent No.: US 12,516,562 B2
(45) Date of Patent: Jan. 6, 2026

(54) VEHICLE-OPENING/CLOSING-BODY DRIVING DEVICE

(71) Applicant: MITSUI KINZOKU ACT CORPORATION, Yokohama (JP)

(72) Inventors: Kiichi Noguchi, Yokohama (JP); Yoshiaki Yokota, Yokohama (JP)

(73) Assignee: MITSUI KINZOKU ACT CORPORATION, Yokohama (JP)

( * ) Notice: Subject to any disclaimer, the term of this patent is extended or adjusted under 35 U.S.C. 154(b) by 0 days.

(21) Appl. No.: 18/797,209

(22) Filed: Aug. 7, 2024

(65) Prior Publication Data
US 2025/0052105 A1 Feb. 13, 2025

(30) Foreign Application Priority Data
Aug. 9, 2023 (JP) ................................ 2023-129682

(51) Int. Cl.
*E05F 15/622* (2015.01)
*E05F 15/611* (2015.01)

(52) U.S. Cl.
CPC .......... *E05F 15/622* (2015.01); *E05F 15/611* (2015.01); *E05Y 2201/696* (2013.01); *E05Y 2900/531* (2013.01)

(58) Field of Classification Search
CPC .................. E05F 15/622; E05F 15/611; E05Y 2201/696; E05Y 2900/531
See application file for complete search history.

(56) References Cited

U.S. PATENT DOCUMENTS

| | | | |
|---|---|---|---|
| 10,208,516 B2 * | 2/2019 | Miu ........................... | E05F 5/06 |
| 10,378,263 B2 * | 8/2019 | Podkopayev ......... | E05C 17/006 |
| 10,655,378 B2 * | 5/2020 | Podkopayev ............. | F16D 3/46 |
| 10,688,883 B2 * | 6/2020 | Stanic ................ | B60N 2/02246 |
| 11,041,551 B2 * | 6/2021 | Ritter ...................... | F16H 25/22 |
| 11,702,879 B2 * | 7/2023 | Battlogg ................ | B60Q 9/008 49/31 |
| 11,713,609 B2 * | 8/2023 | Leonard ................ | E05F 15/622 49/324 |
| 2012/0000304 A1 * | 1/2012 | Hamminga ........... | E05F 15/622 74/89.23 |

(Continued)

FOREIGN PATENT DOCUMENTS

JP        2021017746 A       2/2021

*Primary Examiner* — Justin B Rephann
(74) *Attorney, Agent, or Firm* — NIXON & VANDERHYE

(57) ABSTRACT

Regarding a vehicle-opening/closing-body driving device comprising a driving assembly having a driving actuator, a casing housing the driving assembly and fixed inside either one of an opening/closing body and a vehicle body, and a coupling mechanism coupling the driving assembly with the other of the opening/closing body and the vehicle body, wherein an output shaft of the driving actuator and the coupling mechanism are arranged to be parallel on a vertical plane perpendicular to a pivoting locus plane of the opening/closing body, it is configured that the coupling mechanism is pivotably supported inside the casing by a pivoting shaft in a vertical direction perpendicular to the pivoting locus plane of the opening/closing body to make the coupling mechanism pivot with respect to the casing according to the opening/closing operation of the opening/closing body.

12 Claims, 18 Drawing Sheets

(56) References Cited

U.S. PATENT DOCUMENTS

| | | | |
|---|---|---|---|
| 2018/0155968 A1* | 6/2018 | Miu | E05F 15/622 |
| 2018/0223583 A1 | 8/2018 | Podkopayev | |
| 2018/0258682 A1* | 9/2018 | Schatz | E05F 15/627 |
| 2020/0040971 A1* | 2/2020 | Ritter | F16H 25/20 |
| 2020/0215883 A1* | 7/2020 | Noguchi | B60J 5/0472 |
| 2022/0149761 A1* | 5/2022 | Battlogg | E05F 15/611 |

* cited by examiner

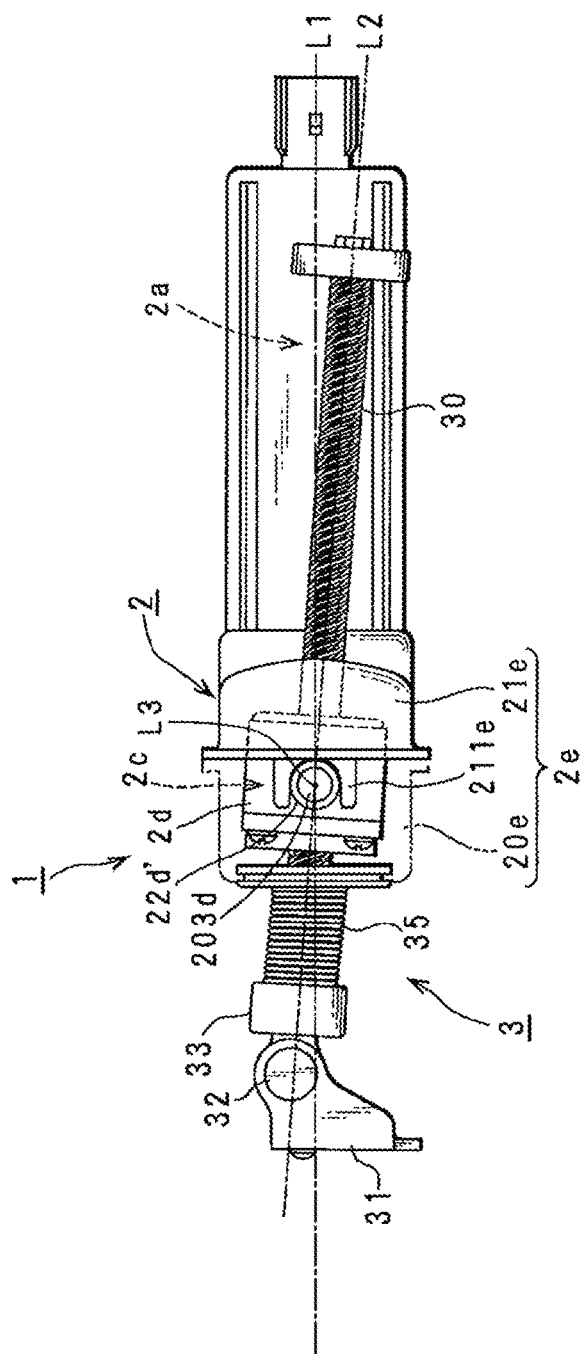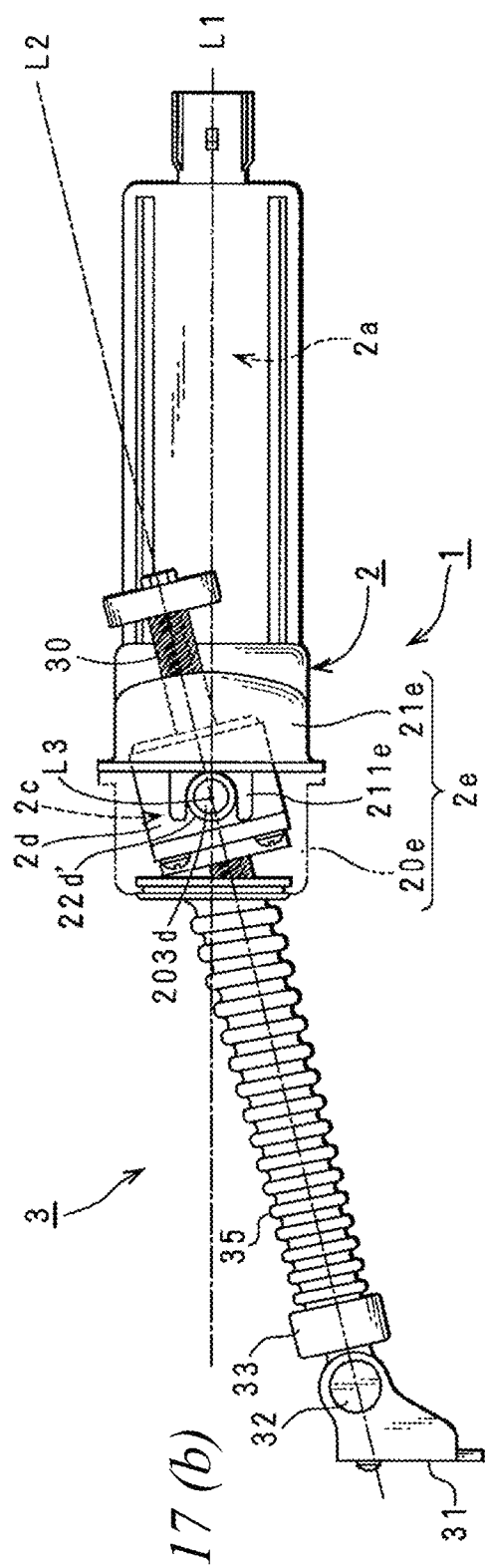
FIG. 17 (a)
FIG. 17 (b)

VEHICLE-OPENING/CLOSING-BODY DRIVING DEVICE

CROSS-REFERENCE TO RELATED APPLICATIONS

This application claims benefit of the benefit of previously filed JP Application No. 2023-129682 which was filed Aug. 9, 2023, which is incorporated herein by reference in its entirety.

FIELD OF THE INVENTION

The present invention relates to a vehicle-opening/closing-body driving device, and particularly to a vehicle-opening/closing-body driving device having a relatively simple structure and a high transmission efficiency of a driving force of a driving actuator.

BACKGROUND OF THE INVENTION

This section provides background information related to a vehicle-opening/closing-body driving device and is not necessarily prior art to the vehicle-opening/closing-body driving device of the present disclosure.

Conventionally, in a side door opening/closing device of a vehicle for operating a side door swingably supported to a vehicle body to open/close by a motive power of a motor, when a door latch device is unlatched, the side door is operated to open to a fully open position by the motive power of the motor of a driving unit, and when a door-closing switch is operated in an opened state, the side door is operated to close by the motor of the driving unit. A side door provided with a side door opening/closing device is sometimes referred to as "power hinge door."

US 2018/0223583 A describes a power door actuation mechanism which comprises a housing fixed in a door of a motor vehicle, an electric motor housed in the housing, a drive spindle driven by the electric motor, a pinion gear fixed on the drive spindle, a drive nut assembly comprising a drive nut and driven by the electric motor via the pinion gear, and a lead screw coupled to a vehicle body and engaging with the drive nut; the power door actuation mechanism driving the door to open/close by driving the drive nut assembly with the electric motor to move the lead screw relative to the drive nut. In the actuation mechanism of US 2018/0223583 A, a position of the spindle shaft with respect to the door is fixed, and the drive nut assembly is pivotably coupled with the drive spindle to pivot around a pivot center of the drive nut assembly by swing of the lead screw according to the opening/closing operation of the door.

JP 2021-17746 A describes a vehicle side door opening/closing device provided with a driving unit arranged in a housing space in a side door of a vehicle and a coupling mechanism coupling the driving unit with a vehicle body, wherein the driving unit comprises a motor arranged such that its rotating shaft is oriented in a vertical direction, a gear case connected with the motor and fixed to the side door, a deceleration mechanism incorporated in the gear case, an output gear provided to an output part of the deceleration mechanism, and an engagement holding unit rotatably connected with the gear case, wherein the coupling mechanism is configured by a rack of which an end portion is pivotably supported to the vehicle body and another end portion engages with the output gear, and wherein the door is driven to open/close by moving the rack according to the rotation of the output gear.

SUMMARY OF THE INVENTION

The present invention provides a vehicle-opening/closing-body driving device having a relatively simple structure and a high transmission efficiency of a driving force of a driving actuator, this device comprises a driving assembly having a driving actuator, a casing housing the driving assembly and fixed inside either one of an opening/closing body and a vehicle body, and a coupling mechanism coupling the driving assembly with the other of the opening/closing body and the vehicle body, an output shaft of the driving actuator and the coupling mechanism being arranged to be parallel on a vertical plane perpendicular to a pivoting locus plane of the opening/closing body, wherein it is configured that the coupling mechanism is pivotably supported inside the casing by a pivoting shaft in a vertical direction perpendicular to the pivoting locus plane of the opening/closing body.

Thus, a vehicle-opening/closing-body driving device according to the present invention to drive an opening/closing body pivotably supported to a vehicle body, which comprises:
  a driving assembly provided in either one of the opening/closing body and the vehicle body to have a driving actuator;
  a casing fixed in the opening/closing body or the vehicle body in which the driving assembly is provided to house the driving assembly; and
  a coupling mechanism coupling the driving assembly and the other of the opening/closing body or the vehicle body, which is inserted through the casing in a direction parallel to a pivoting locus plane of the opening/closing body such that one end portion of the coupling mechanism is protruded from the opening/closing body or the vehicle body in which the casing is fixed to be pivotably supported to the other of the opening/closing body or the vehicle body and the other end portion of the coupling mechanism is inserted into an inside of the opening/closing body or the vehicle body to which the casing is fixed, the coupling mechanism driving the opening/closing body to open and close with a driving force of the driving actuator by being pushed toward a side of the one end portion relative to the casing and by being retracted toward a side of the other end portion relative to the casing,
  wherein an output shaft of the driving actuator and the coupling mechanism are arranged to be parallel on a plane perpendicular to the pivoting locus plane, and
  wherein the coupling mechanism is pivotably supported in the casing by a pivoting shaft in a direction perpendicular to the pivoting locus plane to pivot with respect to the casing accompanied with the opening/closing operation of the opening/closing body.

According to the present invention, regarding a vehicle-opening/closing-body driving device comprising a driving assembly having a driving actuator, a casing housing the driving assembly and fixed inside either one of an opening/closing body and a vehicle body, and a coupling mechanism coupling the driving assembly with the other of the opening/closing body and the vehicle body, wherein an output shaft of the driving actuator and the coupling mechanism are arranged to be parallel on a vertical plane perpendicular to a pivoting locus plane of the opening/closing body, since it is configured that the coupling mechanism is pivotably supported inside the casing by a pivoting shaft in a vertical direction perpendicular to the pivoting locus plane of the opening/closing body to make the coupling mechanism pivot with respect to the casing according to the opening/closing operation of the opening/closing body, a vehicle-opening/closing-body driving device having a relatively simple structure and a high transmission efficiency of a driving force of the driving actuator can be obtained.

BRIEF DESCRIPTION OF THE DRAWINGS

FIG. 17(a) is a top plan view showing the side door opening/closing device when the side door is in the closed state, and FIG. 17(b) is a top plan view showing the side door opening/closing device when the side door is in the fully opened state.

EMBODIMENTS OF THE INVENTION

Figure 1:
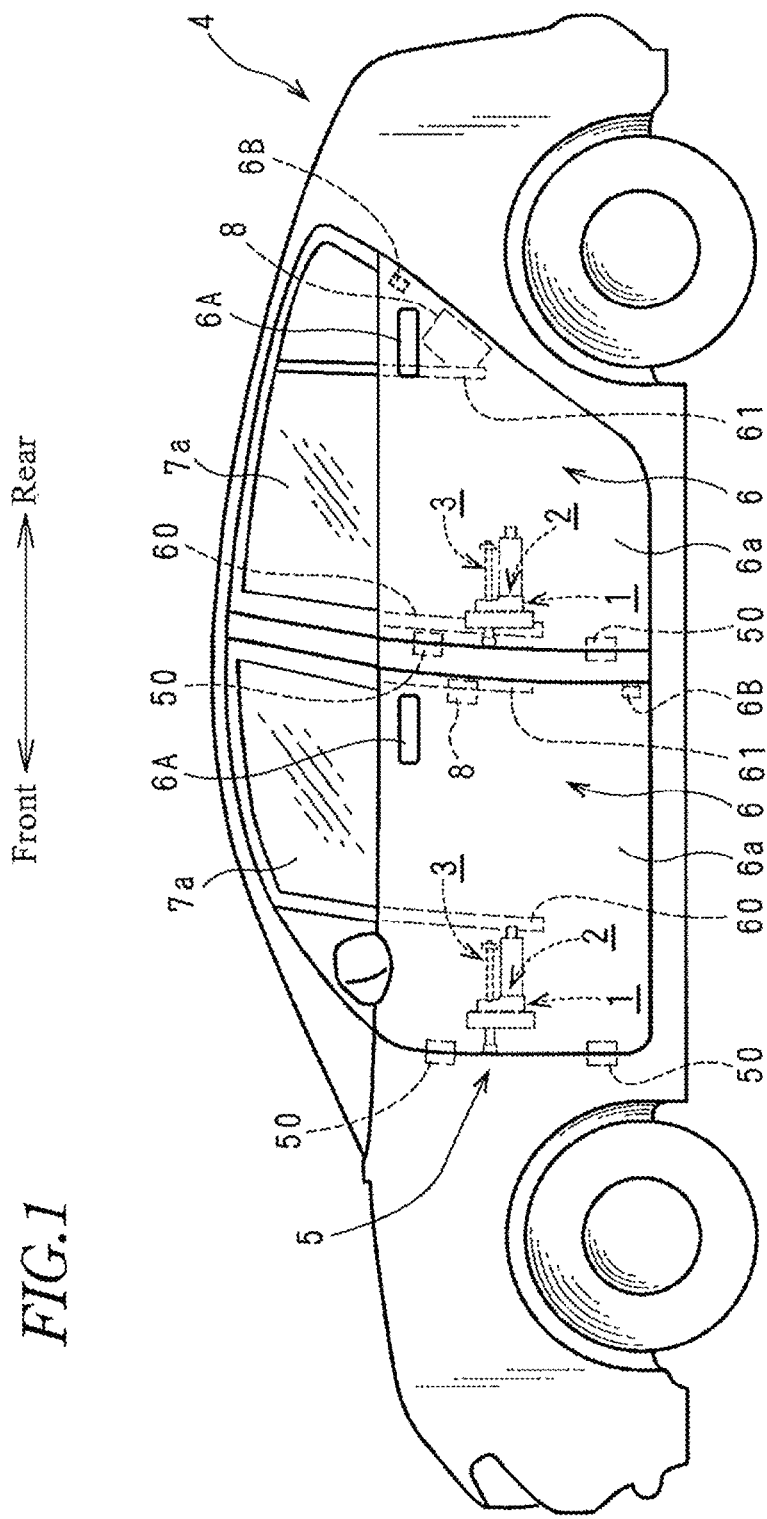
FIG. 1 is a side view showing a vehicle to which a vehicle-opening/closing-body driving device of the present invention is applied as a side door opening/closing device.
Figure 2:
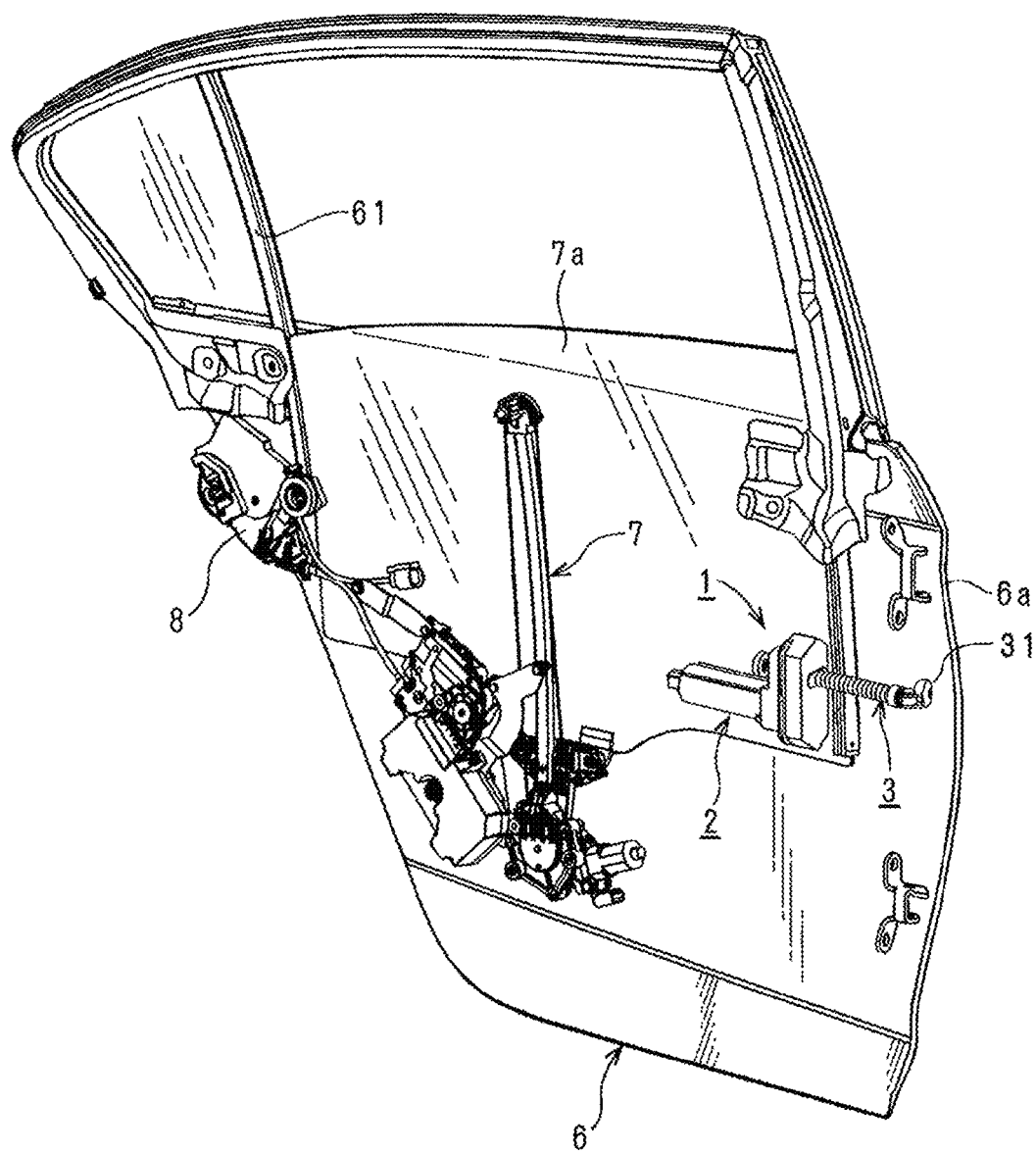
FIG. 2 is a perspective view showing an internal structure of a side door from which an inner panel is removed.

A vehicle-opening/closing-body driving device according to the present invention to drive an opening/closing body pivotably supported to a vehicle body, which comprises:
  a driving assembly provided in either one of the opening/closing body and the vehicle body to have a driving actuator;
  a casing fixed in the opening/closing body or the vehicle body in which the driving assembly is provided to house the driving assembly; and
  a coupling mechanism coupling the driving assembly and the other of the opening/closing body or the vehicle body, which is inserted through the casing in a direction parallel to a pivoting locus plane of the opening/closing body such that one end portion of the coupling mechanism is protruded from the opening/closing body or the vehicle body in which the casing is fixed to be pivotably supported to the other of the opening/closing body or the vehicle body and the other end portion of the coupling mechanism is inserted into an inside of the opening/closing body or the vehicle body to which the casing is fixed, the coupling mechanism driving the opening/closing body to open and close with a driving force of the driving actuator by being pushed toward a side of the one end portion relative to the casing and by being retracted toward a side of the other end portion relative to the casing,
  wherein an output shaft of the driving actuator and the coupling mechanism are arranged to be parallel on a plane perpendicular to the pivoting locus plane, and
  wherein the coupling mechanism is pivotably supported in the casing by a pivoting shaft in a direction perpendicular to the pivoting locus plane to pivot with respect to the casing accompanied with the opening/closing operation of the opening/closing body.

In a preferred example of the present invention, the vehicle-opening/closing-body driving device further comprises a transmission member which is arranged in the casing and is rotated with the driving actuator by engaging with the output shaft of the driving actuator to transmit the driving force of the driving actuator to the coupling mechanism, wherein the output shaft and the transmission member are coupled with a joint structure in which an engagement angle is variable. Therefore, the vehicle-opening/closing-body driving device has excellent layout properties and can surely transmit the driving force of the driving actuator to the coupling mechanism.

In a more preferred example of the present invention,
  a peripheral surface of a tip portion of the output shaft of the driving actuator is provided with a plurality of protrusions elongating along an axis of the output shaft, the transmission member is provided with an engaging hole having a plurality of engaging grooves of U-shaped cross section respectively engaging with the protrusions of the output shaft, and each side surface of the protrusions in a rotation progression direction contacts with each facing side wall of the engagement grooves to rotate the transmission member,
  wherein a peripheral portion of each of the protrusions is formed to have a curved surface of which a protruding height gradually decreases from the most protruding portion on a tip side of the output shaft toward a base end side of the output shaft in a side view, inner peripheral walls of the engaging hole respectively facing the peripheral portions elongate along an axis direction of the transmission member, and therefore the transmission member pivots with respect to the output shaft such that the engagement angle against the output shaft varies, even during this pivot, at least a part of the respective side surfaces of the protrusions in the rotation progression direction contact with the respective facing side walls of the engagement grooves to rotate the transmission member, and thereby coupling the output shaft with the transmission member by the joint structure in which the engagement angle is variable, and the transmission member transmits the driving force of the driving actuator to the coupling mechanism in both forward and reverse rotation directions of the output shaft while pivoting with respect to the output shaft.

In another preferred example of the present invention, the coupling mechanism comprises a lead screw which is inserted through the casing in the direction parallel to the pivoting locus plane of the opening/closing body such that one end portion of the lead screw is protruded from the opening/closing body or the vehicle body in which the casing is fixed to be pivotably supported to the other of the opening/closing body or the vehicle body and the other end portion of the lead screw is inserted into the inside of the opening/closing body or the vehicle body to which the casing is fixed, the lead screw moving the opening/closing body in an opening direction with the driving force of the driving actuator by being pushed toward a side of the one end portion relative to the casing and moving the opening/closing body in a closing direction by being retracted toward a side of the other end portion relative to the casing, wherein the transmission member comprises a first transmission member engaging with the output shaft of the driving actuator to be rotated by the driving actuator and a second transmission member which is mounted on the lead screw to transmit rotation of the first transmission member to the lead screw, the first transmission member and the output shaft are coupled with the joint structure, and therefore the transmission member configures a conversion mechanism which converts a direction of the driving force within the direction parallel to the pivoting locus plane of the opening/closing body when the transmission member transmits the driving force to the coupling mechanism, and wherein the first and second transmission members configuring the conversion mechanism are linearly arranged along the pivoting shaft in the direction perpendicular to the pivoting locus plane. Therefore, the casing can be arranged close to the mounting surface of the opening/closing body (door), thereby providing the vehicle-opening/closing-body driving device having excellent layout properties.

In still another preferred example of the present invention, the conversion mechanism is pivotably supported by the pivoting shaft in the direction perpendicular to the pivoting locus plane of the opening/closing body, and pivots with respect to the casing with the coupling mechanism accompanied with the pivot of the coupling mechanism. Therefore, it is possible to provide the vehicle-opening/closing-body driving device that has no restrictions on installation location and provides reliable operation.

In still another preferred example of the present invention, the first and second transmission members are housed in a support body which is pivotably supported by the pivoting shaft in the direction perpendicular to the pivoting locus plane of the opening/closing body in the casing, each of the first and second transmission members is rotatably supported to the support body to be linearly arranged along the pivoting shaft in the perpendicular direction, and the lead screw is inserted through the support body in the direction parallel to the pivoting locus plane and is supported to the support body via the second transmission member mounted on the lead screw.

In still another preferred example of the present invention, on each surface of the casing in the one end portion side and the other end portion side of the coupling mechanism, an aperture through which the coupling mechanism is inserted to pivot is formed in the direction perpendicular to the pivoting shaft perpendicular to the pivoting locus plane of the opening/closing body. Since the above-described conversion mechanism is pivotably supported inside the casing along the plane parallel to the pivoting locus plane of the opening/closing body, it is possible to reduce the size of each of the apertures to the minimum necessary. Thus, the size of the device can be reduced and water ingress through the aperture on the surface of the casing in the one end portion side of the lead screw can also be minimized.

In still another preferred example of the present invention, the lead screw is covered with a cylindrical tube from a coupling part which couples the coupling mechanism with the other of the opening/closing body or the vehicle body to the aperture on the surface of the casing in the one end portion side of the lead screw. Therefore, regardless of the position of the opening/closing body (door), water ingress can be surely prevented, and the performance of the device can be maintained over a long period of time.

Hereinafter, the present invention is explained in detail by referring to an embodiment of a vehicle-opening/closing-body driving device on the basis of the drawings as follows, in which this device is applied as a device to open and close a side door of a vehicle. However, the present invention is not limited to the following description and various modifications may be made within the scope of the technical thought of the present invention.

As shown in FIGS. 1 to 4, a side door opening/closing device 1 comprising a driving assembly 2 arranged in a housing space 62 in an opening/closing body (side door) 6 of a vehicle 4 and a coupling mechanism 3 coupling the driving assembly 2 with a vehicle body 5.

A side door 6 comprises an outer panel 6a which forms the vehicle exterior side and is made of metal and an inner panel 6b which forms the vehicle interior side and is made of metal. Preferably, a trim panel 6c is fixed to a side surface of the inner panel 6b facing the vehicle interior side.

The side door 6 is provided with a door glass 7a moved up and down by a lifting mechanism 7 arranged in the side door 6, a door latch device 8 holding the side door 6 in a closed position, an outside handle 6A arranged on the outer panel 6a side, and an inside handle (not shown) arranged on the inner panel 6b side. A capacitance sensor (not shown) capable of detecting contact or approach of a user's hand is provided on or near the outside handle 6A. The side door 6 is provided with an angular velocity sensor 6B detecting an opening angle thereof. Suitably, the angular velocity sensor 6B is arranged on a pivot end portion (rear end portion) of the side door 6. Detection signals of the capacitance sensor and the angular velocity sensor 6B are respectively transmitted to a control unit (not shown) arranged at an appropriate position in the vehicle 4. The control unit controls a motor 2a described below of the driving assembly 2 based on each of the detection signals received.

A front and rear edges of the door glass 7a are respectively supported by a front side guide rail 60 and a rear side guide rail 61 such that the door glass 7a is slidable in a vehicle vertical direction, and that the door glass 7a moves up and down between the outer and inner panels 6a, 6b to approximately bisect an internal space between the outer and inner panels 6a, 6b. The housing space 62 in which the side door opening/closing device 1 is arranged is formed in the space partitioned by the outer and inner panels 6a, 6b.

The side door 6 is pivotably supported to the vehicle body 5 in a left-right direction by a pair of upper and lower door hinges 50, 50. Each of the door hinges 50, 50 is configured by a fixing member 50a fixed to the vehicle body 5 and a movable member 50b which is fixed to a front-end surface of the side door 6 and is pivotably coupled with the fixing member 50a by a hinge shaft 50c oriented in the vehicle vertical direction.

Between the pair of upper and lower door hinges 50, 50, a vehicle body side bracket 31 of the coupling mechanism 3 of the side door opening/closing device 1 is fixed to the vehicle body 5. The vehicle body side bracket 31 is coupled with the driving assembly 2 via a lead screw 30 configuring the coupling mechanism 3.

Figure 3:
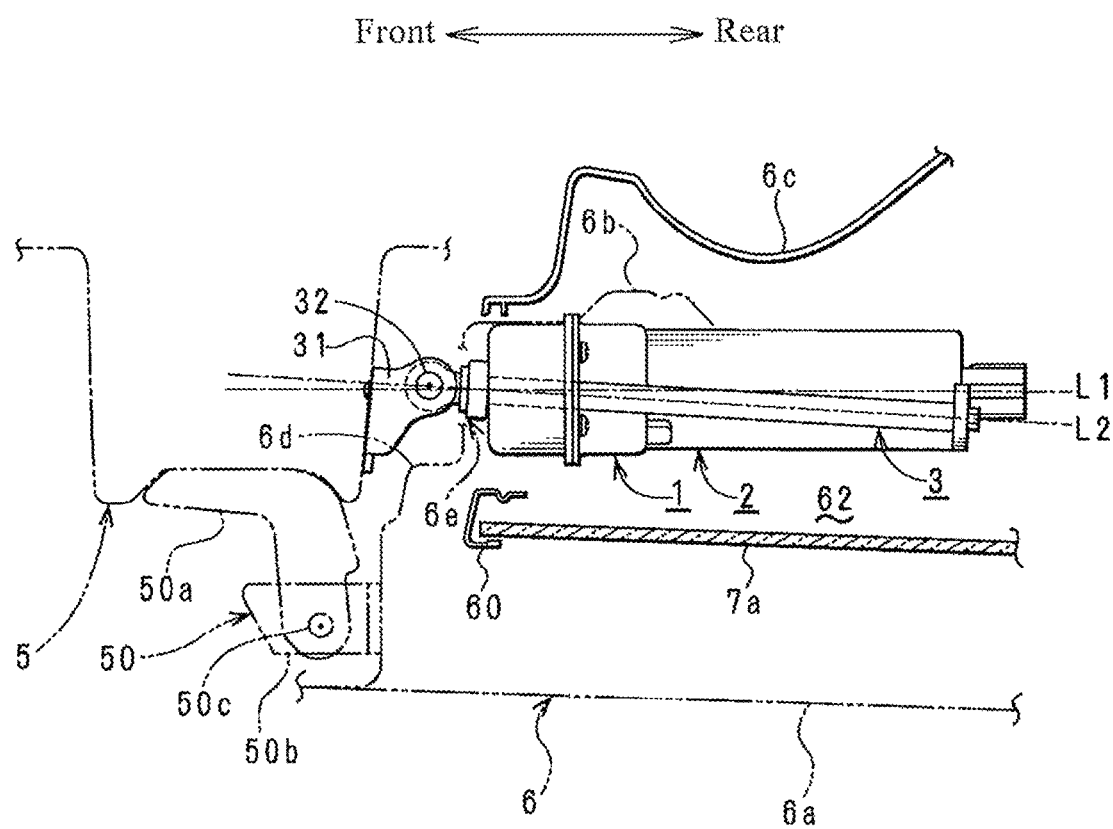
FIG. 3 is a partial top plan view showing an internal structure of the side door in a closed state.
Figure 4:
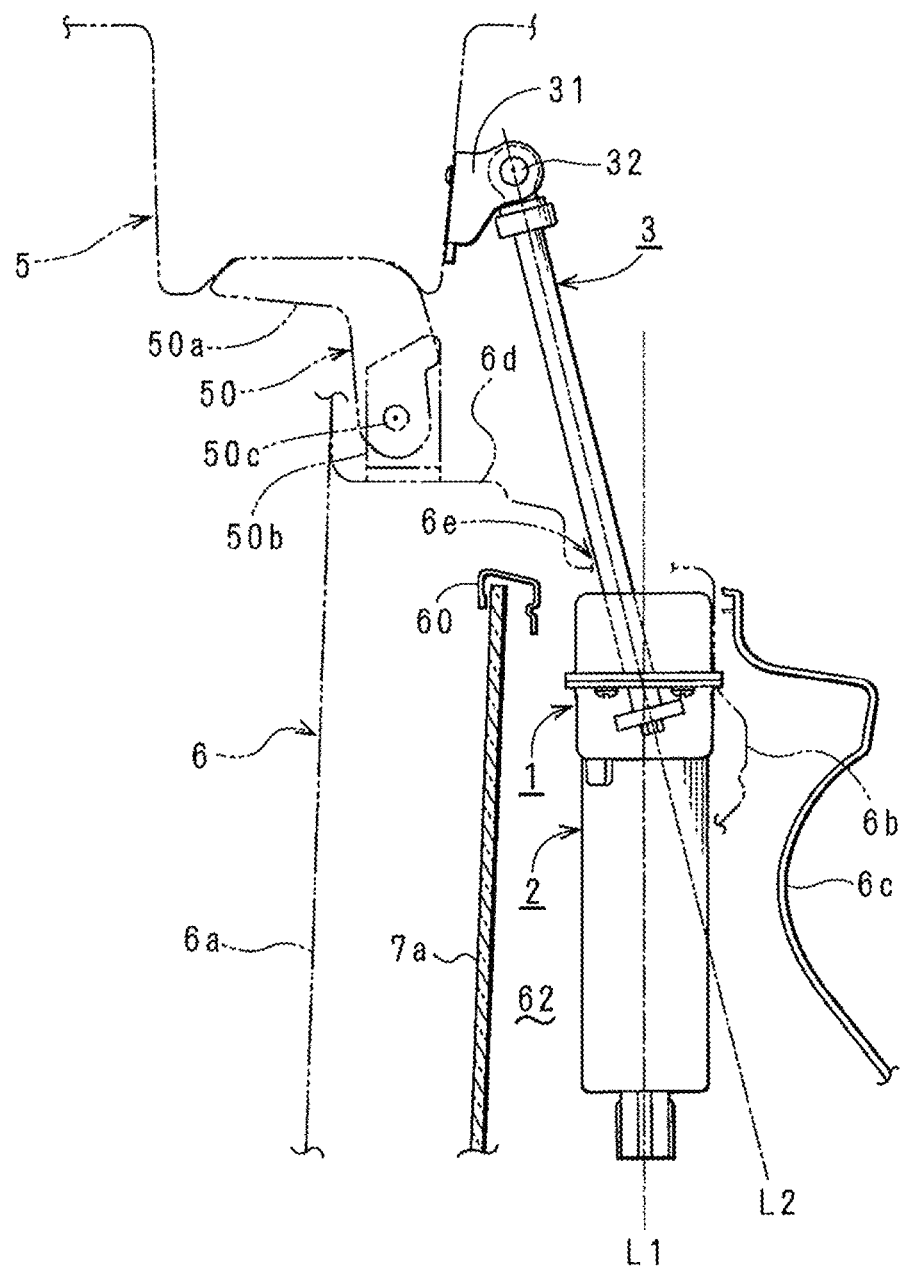
FIG. 4 is a partial top plan view showing the internal structure of the side door in a fully opened state.
Figure 5:
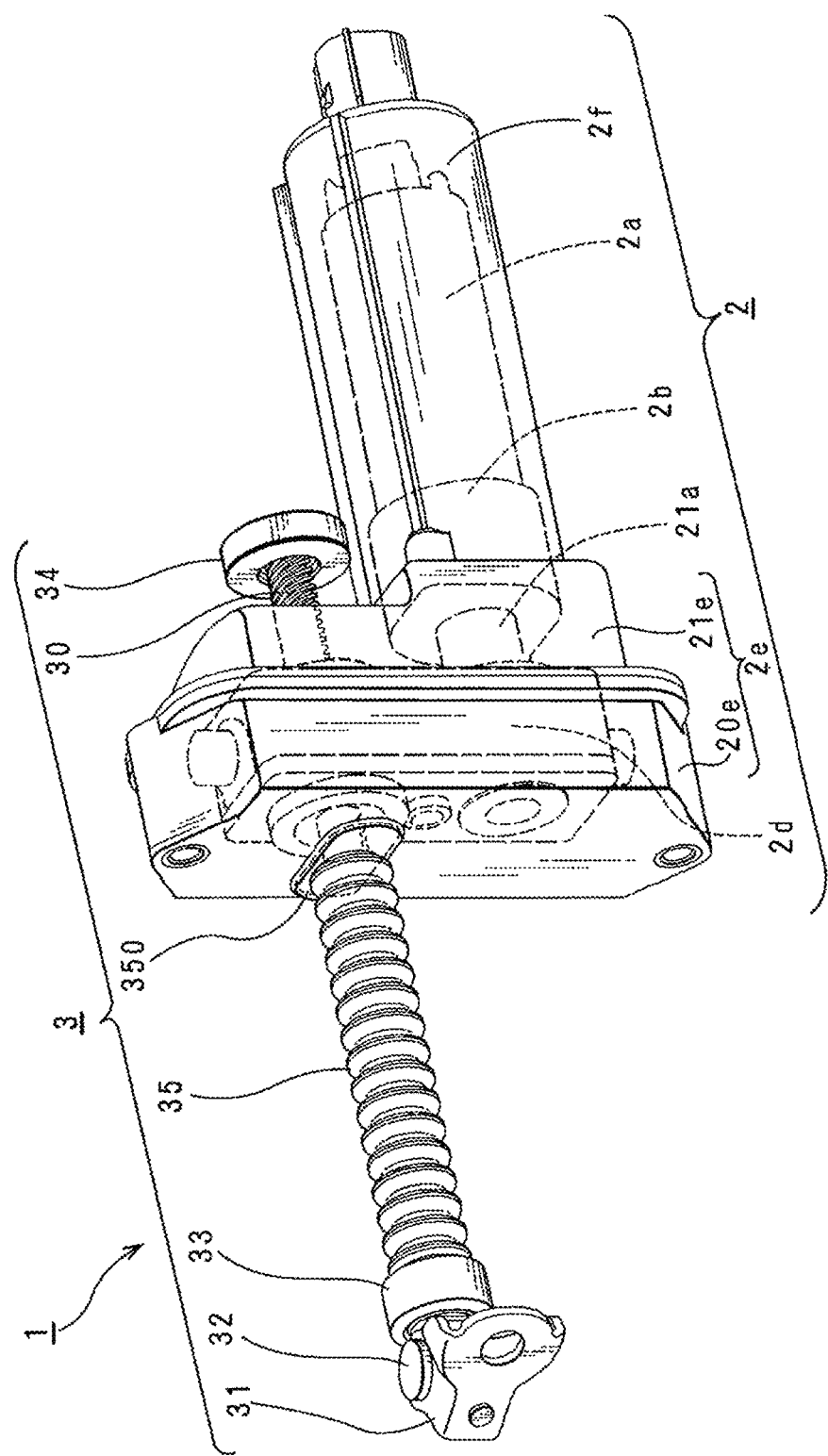
FIG. 5 is a perspective view showing the side door opening/closing device viewed from a coupling mechanism side.
Figure 6:
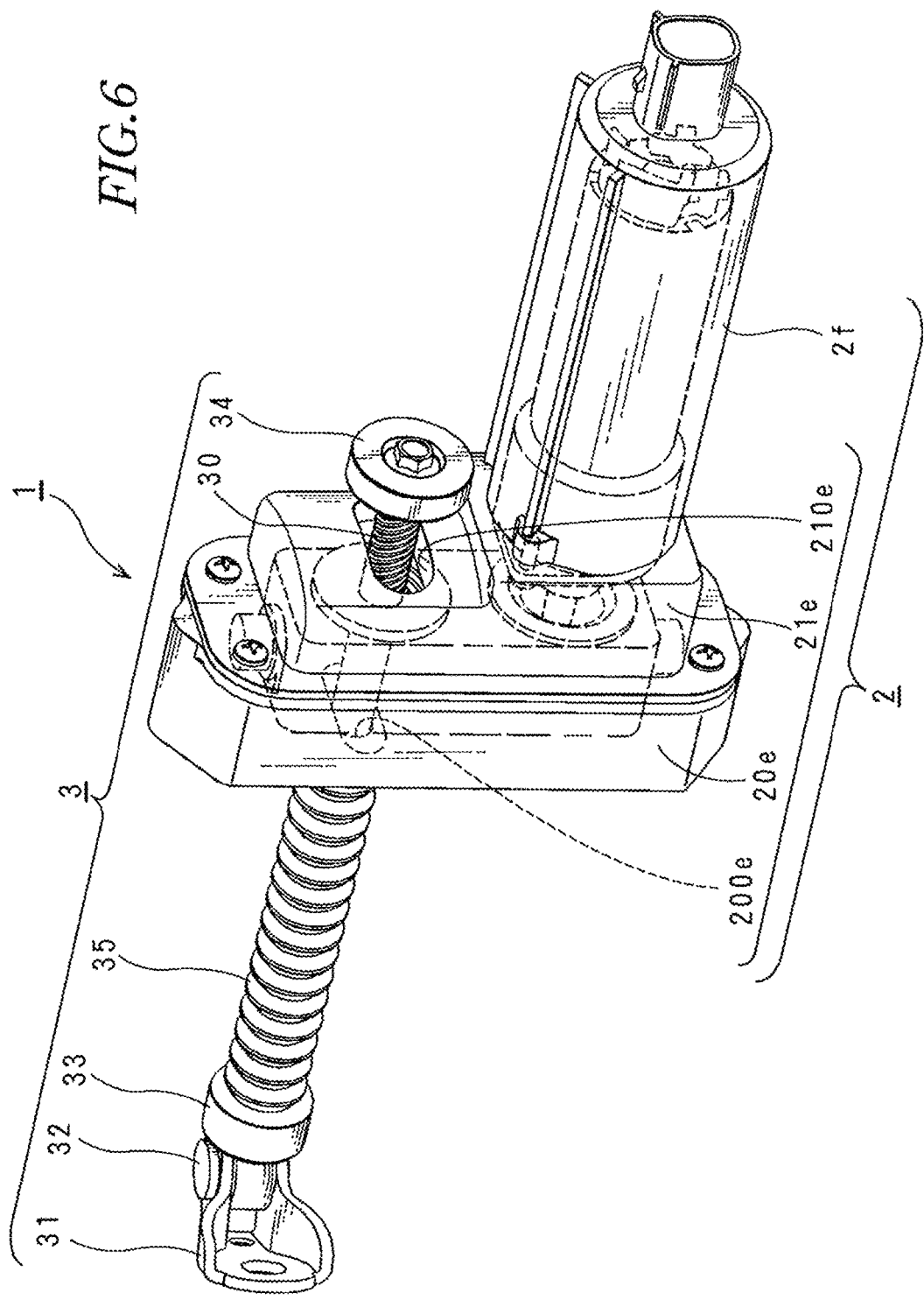
FIG. 6 is a perspective view showing the side door opening/closing device viewed from a driving assembly side.
Figure 7:
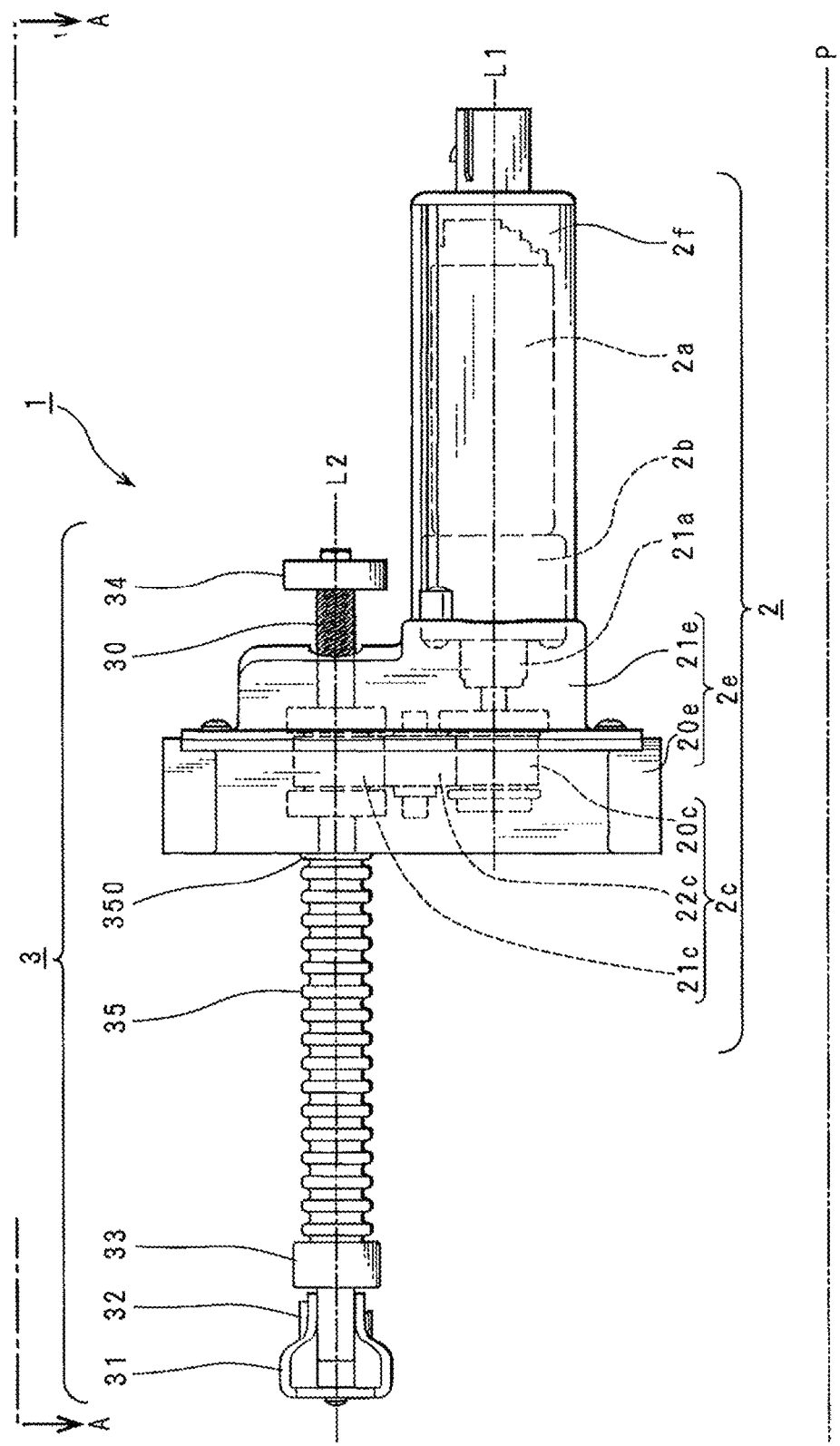
FIG. 7 is a side view showing the side door opening/closing device.
Figure 8:
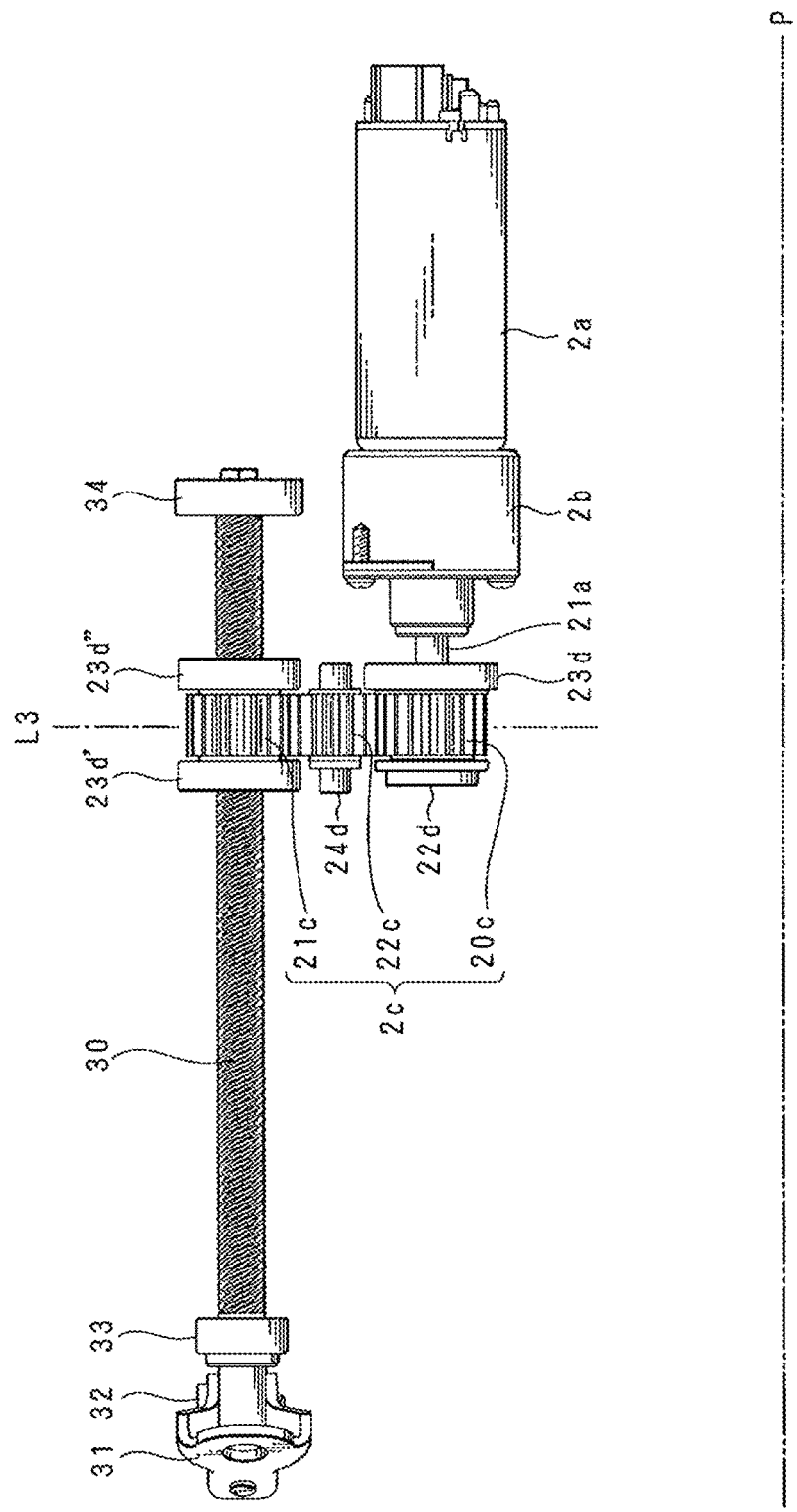
FIG. 8 is a side view schematically showing an internal structure of the side door opening/closing device.
Figure 9:
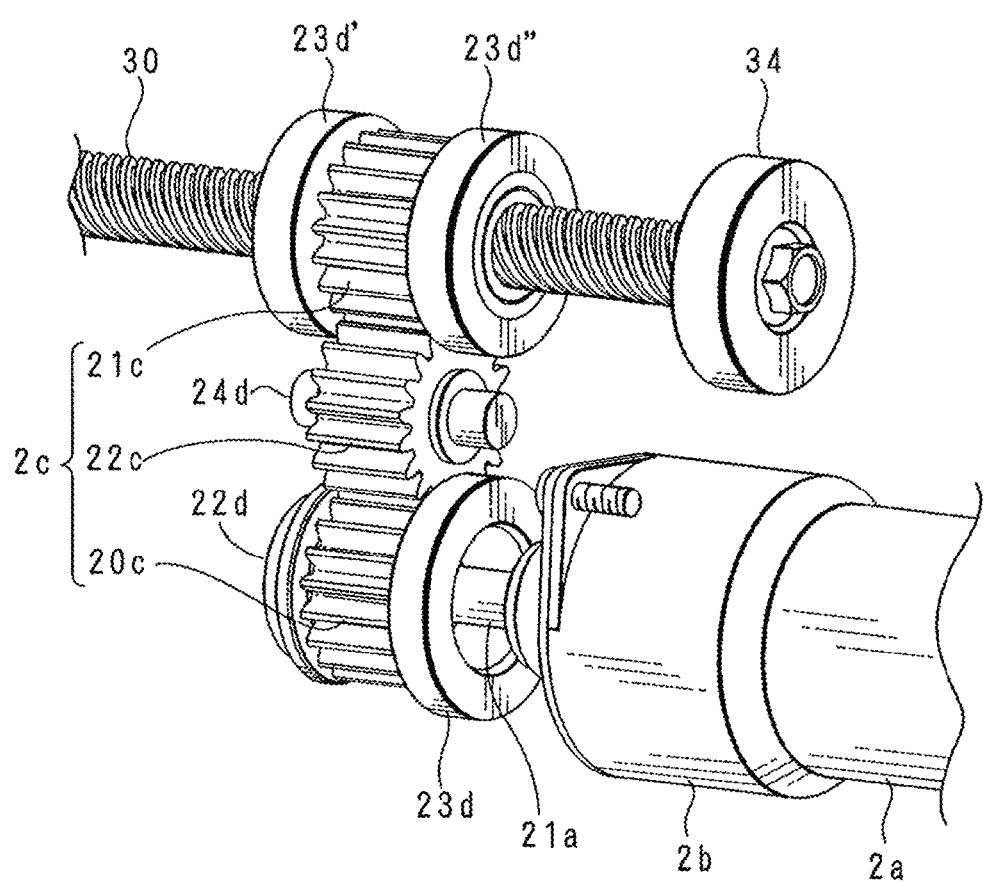
FIG. 9 is a perspective view showing a conversion mechanism of the side door opening/closing device.

As shown in FIGS. 1 to 8, the lead screw 30 extends in a direction parallel to a pivoting locus plane of the side door 6 (a vehicle horizontal direction in the shown example), wherein the pivoting locus plane is a plane which includes a pivoting locus, is parallel to the paper surface in FIGS. 3, 4, and is indicated by the reference sign P in FIGS. 7 and 8 to extend in a horizontal direction perpendicular to the paper surface. A front-end portion of the lead screw 30 is inserted through an aperture 6e formed on a front panel 6d of the side door 6 to protrude forward, and is pivotably coupled with the vehicle body side bracket 31 along with a parallel plane with the pivoting locus plane P of the side door 6 (a vehicle horizontal plane in the shown example) by a coupling shaft 32 oriented in the vehicle vertical direction. A stopper 34 made of an elastic material such as rubber is fixed to a rear-end portion of the lead screw 30. The lead screw 30 engages with a second transmission gear 21c of a conversion mechanism 2c described below of the driving assembly 2.

As shown in FIGS. 5 to 13, the driving assembly 2 comprises the motor 2a as a driving actuator, of which an output shaft 21a is arranged to be oriented in the direction parallel to the pivoting locus plane P of the side door 6 (the vehicle horizontal direction in the shown example); a deceleration mechanism 2b decelerating rotation of a rotating shaft 20a of the motor 2a; the conversion mechanism 2c transmitting a driving force of the motor 2a to the coupling mechanism 3; a conversion-mechanism support body 2d as a support body supporting the conversion mechanism 2c; and a casing 2e fixed to the side door 6 to rotatably support the conversion-mechanism support body 2d inside.

Figure 10:
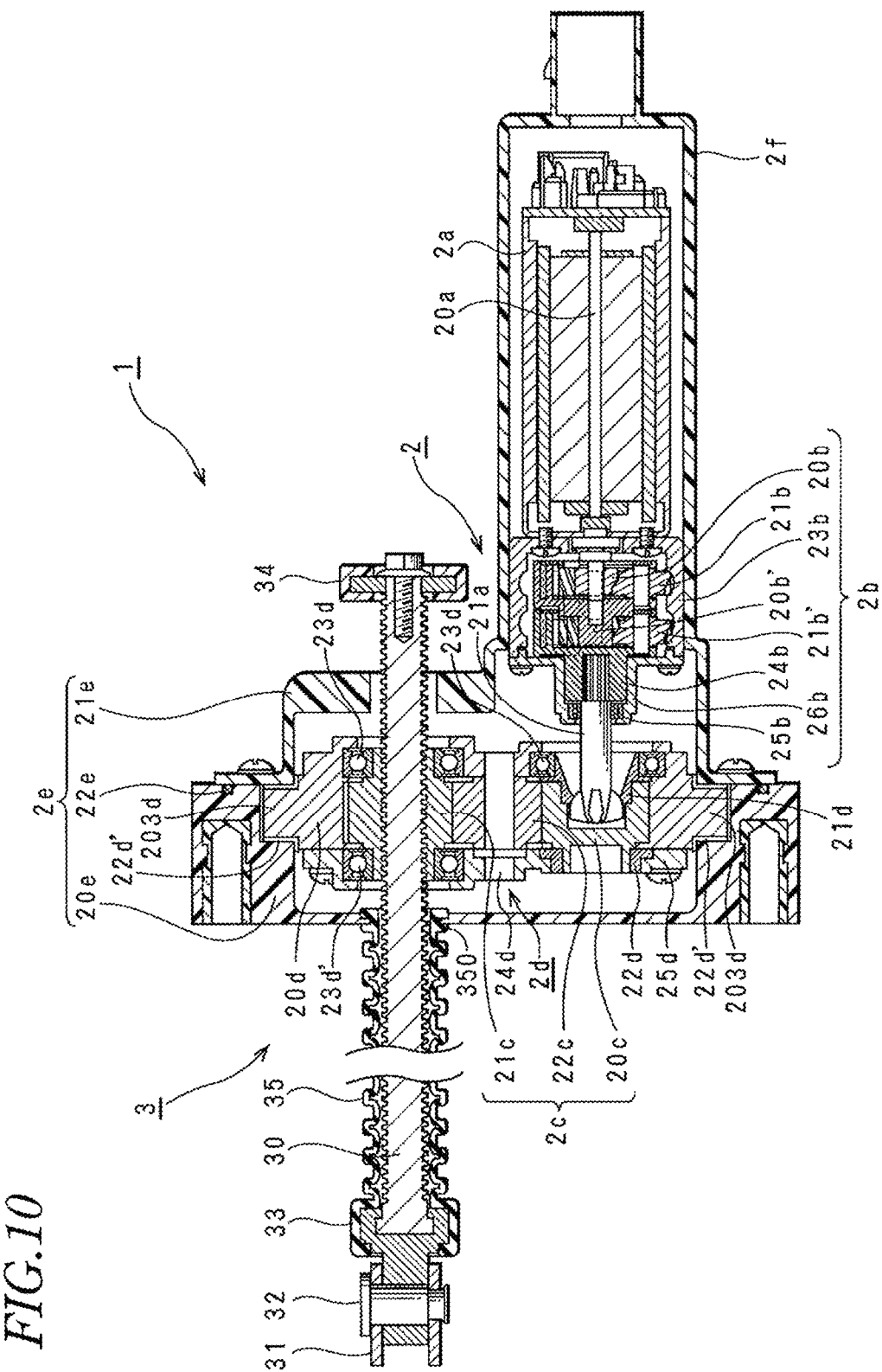
FIG. 10 is a cross-sectional view taken along the line A-A in FIG. 7.
Figure 11:
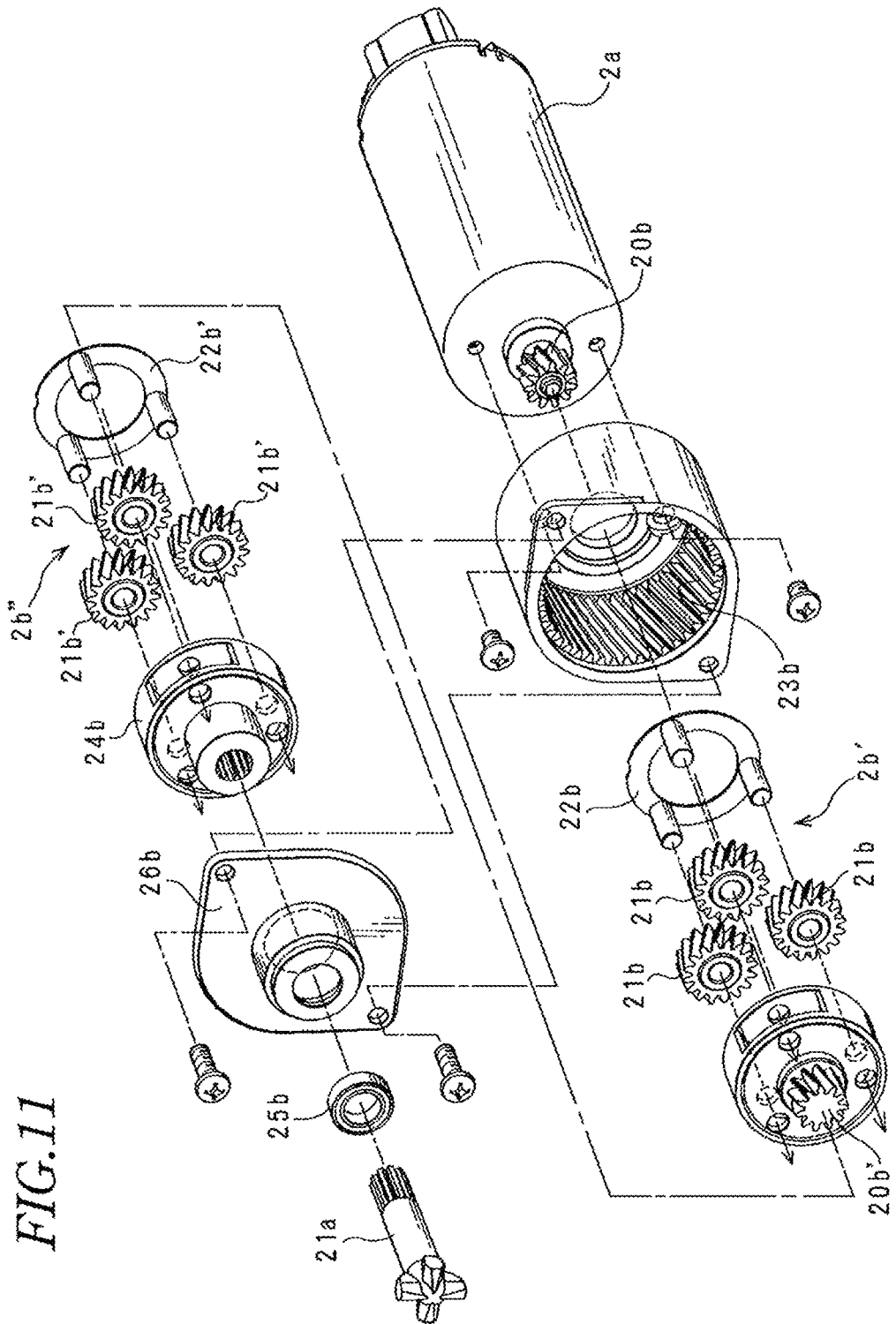
FIG. 11 is an exploded perspective view showing a deceleration mechanism of the side door opening/closing device.

The rotation of the rotating shaft 20a of the motor 2a is decelerated via the deceleration mechanism 2b and is transmitted to the output shaft 21a. It is preferable to use a planetary gear mechanism as the deceleration mechanism 2b. Suitably, as shown in FIGS. 10, 11, there are provided a primary planetary gear mechanism 2b' and a secondary planetary gear mechanism 2b'', wherein the primary planetary gear mechanism 2b' comprises a primary sun gear 20b fixed on the rotating shaft 20a of the motor 2a, a plurality of primary planetary gears 21b rotatably supported by respective shafts in the vehicle horizontal direction of a primary planetary carrier plate 22b to engage with the primary sun gear 20b, and an inner gear 23b with which each of the primary planetary gears 21b engages, and wherein the secondary planetary gear mechanism 2b'' comprises a secondary sun gear 20b' which is projected forward on a bottom of the primary planetary carrier plate 22b to further decelerate the rotation output from the primary planetary carrier plate 22b of the primary planetary gear mechanism, a plurality of secondary planetary gears 21b' rotatably supported by respective shafts in the vehicle horizontal direction of a secondary planetary carrier plate 22b' to engage with the secondary sun gear 20b', and the inner gear 23b with which each of the secondary planetary gears 21b' engages. Further suitably, each rotation axis of the primary and secondary sun gears 20b, 20b' is made to coincide with a rotation axis of the rotating shaft 20a of the motor 2a.

The output shaft 21a of the motor 2a is coupled with the secondary planetary carrier plate 22b' outputting a decelerated rotation of the deceleration mechanism 2b via a coupling part 24b to be capable of integrally rotating with the secondary planetary carrier plate 22b'. The output shaft 21a of the motor 2a is rotatably supported to a cover part 26b via a ball bearing 25b, too. The output shaft 21a of the motor 2a is arranged coaxially with the rotating shaft 20a of the motor 2a.

The motor 2a and the deceleration mechanism 2b are coupled in series in the vehicle horizontal direction to form an elongated cylindrical shape extending in the vehicle horizontal direction to be easily stored in the housing space 62.

Further suitably, a power transmission path from the rotating shaft 20a of the motor 2a to the output shaft 21a is arranged on an axis L1 in the vehicle horizontal direction passing through a center of the rotating shaft 20a (see FIG. 7). For example, when planetary gears are used for the deceleration mechanism 2b, the planetary gears are arranged such that a rotation center of the rotating shaft 20a, each rotation center of the sun gears 20b, 20b' of the respective planetary gears, and a rotation center of the output shaft 21a are in a straight line. According to such a configuration, a radial size centered on the rotating shaft 20a can be further reduced.

It is preferable to use a brushless motor as the motor 2a. In the case of using a brushless motor, when two-phase energization (energizing only armature coils of two phases) is performed by fixing the energized phases, a motor torque can be reduced and a brake resistance can be applied to an opening/closing operation of the side door 6. Therefore, it is possible to hold the side door 6 with a predetermined holding force without separately installing an electromagnetic brake and so forth.

Figure 12:
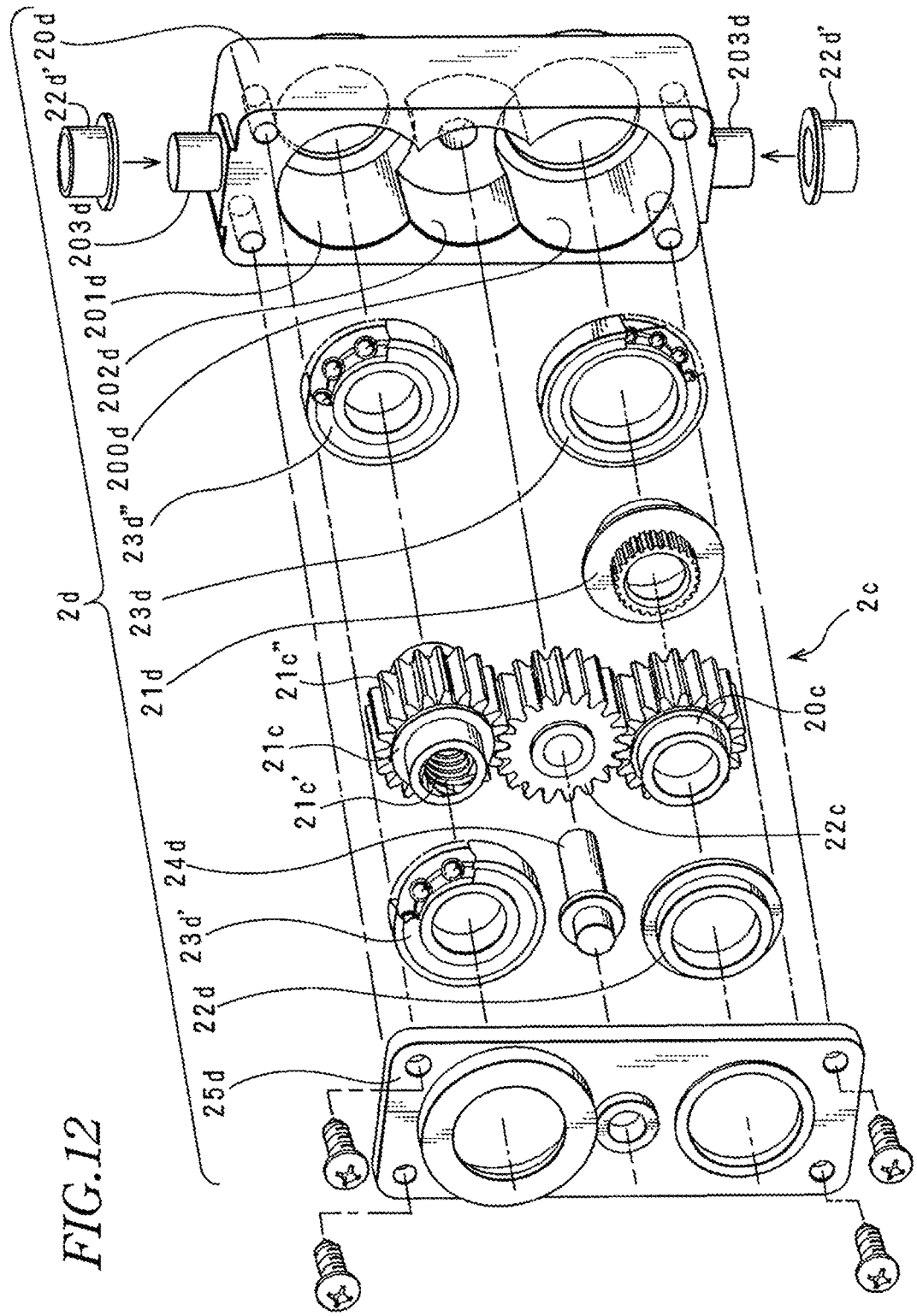
FIG. 12 is an exploded perspective view showing the deceleration mechanism and a support body thereof of the side door opening/closing device.
Figure 13:
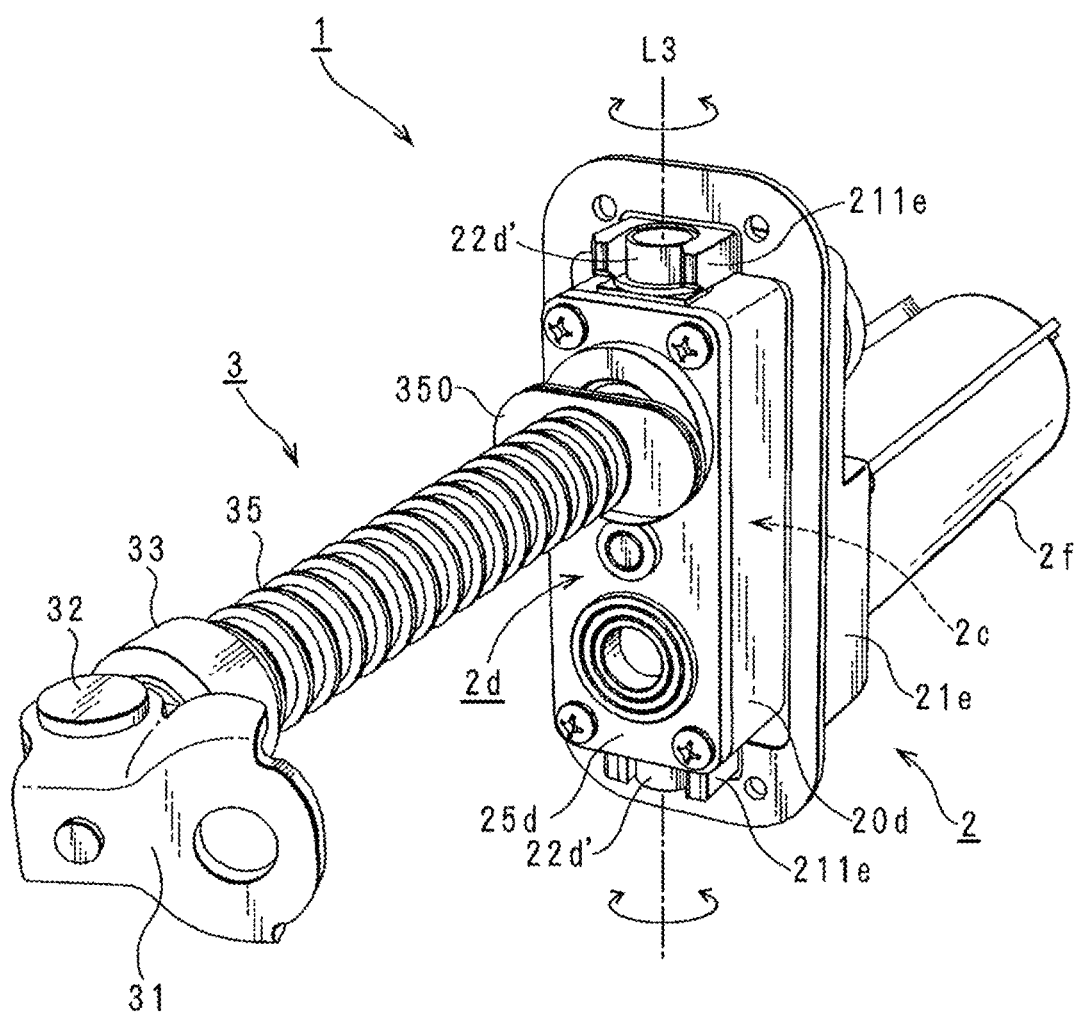
FIG. 13 is a perspective view showing the side door opening/closing device from which a front casing is removed.

As shown in FIGS. 7 to 10, 12, the conversion mechanism 2c comprises a first to third transmission gears 20c, 21c, 22c respectively as a first to third transmission members, wherein the output shaft 21a of the motor 2a is inserted into the first transmission gear 20c, wherein the second transmission gear 21c is mounted on the lead screw 30, and wherein the third transmission gear 22c connects the first and second transmission gears 20c, 21c. As shown in FIGS. 8, 12, 13, each of the first to third transmission gears 20c, 21c, 22c is rotatably housed in the conversion-mechanism support body 2d which is formed in a rectangular shape and is provided with holes 200d, 201d, and 202d for respectively housing the first to third transmission gears, and the first to third transmission gears 20c, 21c, 22c are linearly arranged along an axis L3 of a pivoting shaft which is in a direction perpendicular to the pivoting locus plane P of the side door 6 (the vehicle vertical direction in the shown example) and supports the conversion-mechanism support body 2d. Incidentally, the third transmission gear 22c is not always necessary, and the first and second transmission gears 20c, 21c may be coupled directly.

As shown in FIG. 12, the conversion-mechanism support body 2d comprises a support main body 20d which is provided with the holes 200d, 201d, 202d respectively housing the first to third transmission gears 20c, 21c, 22c; a gear joint 21d which holds a tip portion of the output shaft 21a of the motor 2a inserted into the first transmission gear 20c; a bush 22d and a ball bearing 23d to rotatably support the first transmission gear 20c; ball bearings 23d', 23d'' to rotatably support the second transmission gear 21c; a shaft 24d to rotatably support the third transmission gear 22c; a pair of columnar protrusions 203d, 203d respectively protruding from an upper and lower surfaces of the support main body 20d; bushes 22d', 22d' which are respectively mounted on the columnar protrusions 203d, 203d to rotatably support the support main body 20d to the casing 2e; and a cover part 25d covering a front surface of the support main body 20d.

As shown in FIGS. 5, 10, the lead screw 30 passes through the conversion-mechanism support body 2d to be supported by the conversion-mechanism support body 2d via the second transmission gear 21c. The second transmission gear 21c comprises internal teeth 21c' engaging with the lead screw 30, and external teeth 21c'' engaging with the third transmission gear 22c (see FIG. 12).

The lead screw 30 is covered with a cylindrical tube 35 from a coupling part 33 to which the coupling shaft 32 is inserted together with the vehicle body side bracket 31 to an aperture 200e of the casing 2e. In the present embodiment, the tube 35 is formed in a bellows-like shape. The tube 35 may be formed in a cylindrical telescopic structure. An end portion on the casing 2e side of the tube 35 is provided with a flange portion 350 which can cover the aperture 200e by nipping a periphery of the aperture 200e of the casing 2e from outside and inside. By providing such a tube 35, water ingress can be surely prevented regardless of the position of the door 6, and performance can be maintained over a long term. The tube 35 is preferably made of a thermoplastic resin or an elastic material such as rubber, and more preferably is made of a thermoplastic resin or rubber, each having water resistance. When the tube 35 is formed in a bellows-like shape as in the present embodiment, rubber is suitable, and when the tube 35 is formed in a cylindrical telescopic structure, a thermoplastic resin is suitable. As a thermoplastic resin, it is possible to exemplify polypropylene, polyvinyl chloride, polyacetal, polyacetal copolymer (for example, a copolymer having oxymethylene monomer unit and oxyethylene monomer unit), polycarbonate, polyether ether ketone, polyester, etc., but not limited to them.

As shown in FIG. 5, the conversion-mechanism support body 2d is housed in the casing 2e fixed to the door 6 and is pivotably supported in the casing 2e (see FIGS. 10, 13). As shown in FIGS. 5 to 7, 10, the casing 2e comprises a front and rear casings 20e, 21e which cover the conversion-mechanism support body 2d from the front and rear respectively. The front and rear casings 20e, 21e are integrated by holding an annular packing 22e between flange portions of them (see FIG. 10).

As shown in FIGS. 12, 13, the conversion-mechanism support body 2d is provided with the pair of the columnar protrusions 203d, 203d protruding from the upper and lower surfaces thereof. The conversion-mechanism support body 2d is pivotably supported to the casing 2e by respectively supporting the columnar protrusions 203d, 203d to a pair of support portions 211e, 211e provided on an upper and lower portions on a front surface of the rear casing 21e via the bushes 22d', 22d' respectively.

As described below, the conversion mechanism 2c can pivot with respect to the casing 2e together with the conversion-mechanism support body 2d. Thus, the coupling mechanism 3 can pivot with respect to the casing 2e along a plane parallel to the pivoting locus plane P of the side door 6 (a vehicle horizontal plane in the shown example). As shown in FIG. 6, the upper front side of the front casing 20e and the upper rear side of the rear casing 21e are provided with the apertures 200e, 210e respectively in a direction perpendicular to the axis L3 of the pivoting shaft supporting the conversion-mechanism support body 2d in the vehicle vertical direction, wherein the lead screw 30 is inserted into the apertures 200e, 210e to be allowed to pivot. Since the conversion-mechanism support body 2d is supported in the casing 2e, the apertures 200e, 210e provided on the casing 2e can be made as minimum as necessary, allowing the device to be downsized. Water ingress through the aperture 200e on the front casing 20e can also be minimized.

As shown in FIGS. 5, 7, 10, the motor 2a and the deceleration mechanism 2b are housed in a motor cover 2f which is provided on a lower rear side of the rear casing 21e to be integral with the rear casing 21e. A hole into which a front-end portion of the deceleration mechanism 2b is inserted is provided on the lower rear side of the rear casing 21e.

As shown in FIG. 7, the axis L1 of the output shaft 21a of the motor 2a and an axis L2 of the coupling mechanism 3 are parallel (parallel in a vehicle side view in the shown example) on a vertical plane (the plane parallel to the paper surface in FIG. 7) perpendicular to the pivoting locus plane P of the side door 6. That is, the output shaft 21a of the motor 2a and the coupling mechanism 3 are arranged to be parallel on the vertical plane perpendicular to the pivoting locus plane P of the side door 6 (parallel in a vehicle side view). Therefore, a transmission efficiency of the driving force of the motor 2a is high.

Figure 14:
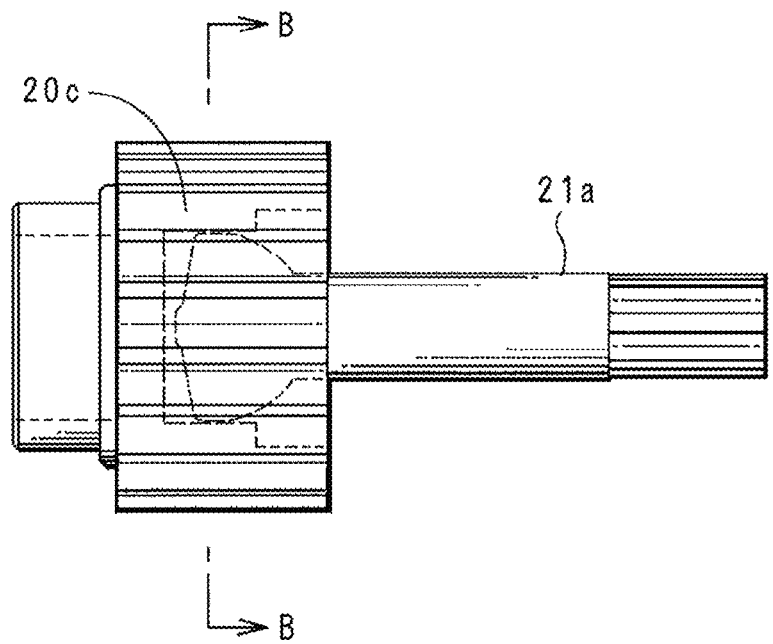
FIG. 14(a) is a side view showing a first transmission gear into which a rotating shaft of a motor is inserted.
FIG. 14(b) is a cross-sectional view taken along the line B-B in FIG. 14(a).
Figure 14:
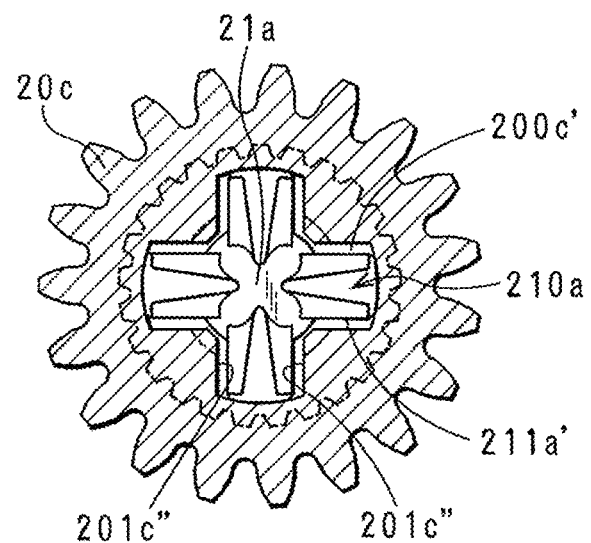
Figure 15:
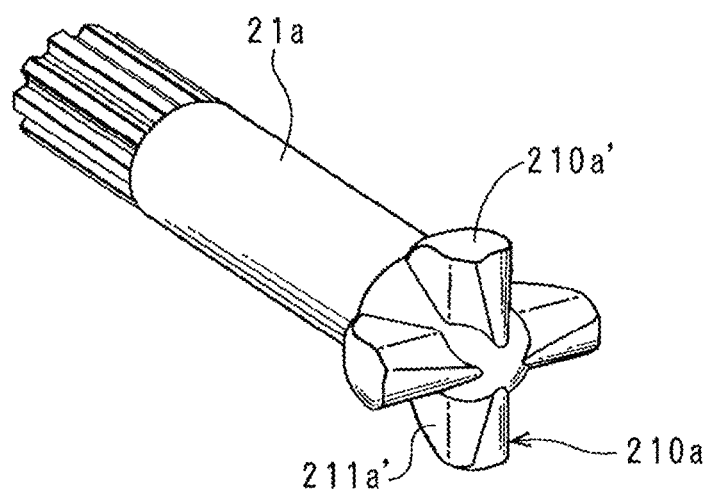
FIG. 15(a) is a perspective view showing the rotating shaft of the motor from a tip side.
FIG. 15(b) is a perspective view showing a state where the rotating shaft of the motor is going to be fit to the first transmission gear.
Figure 15:
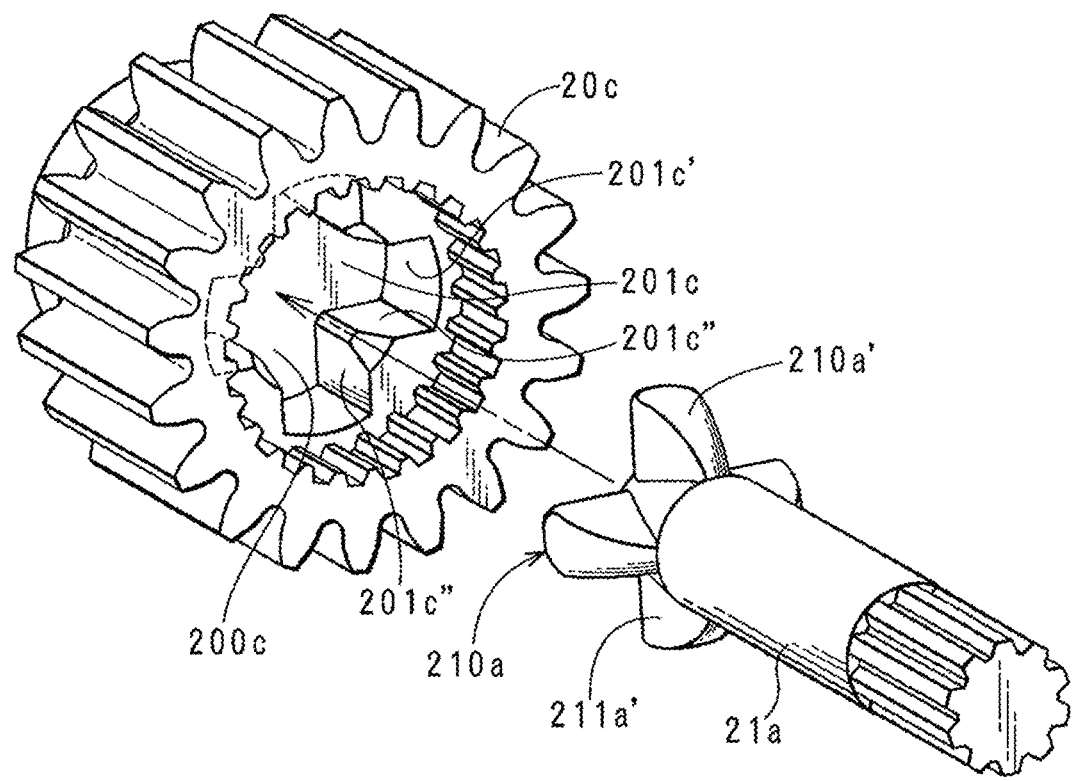
Figure 16:
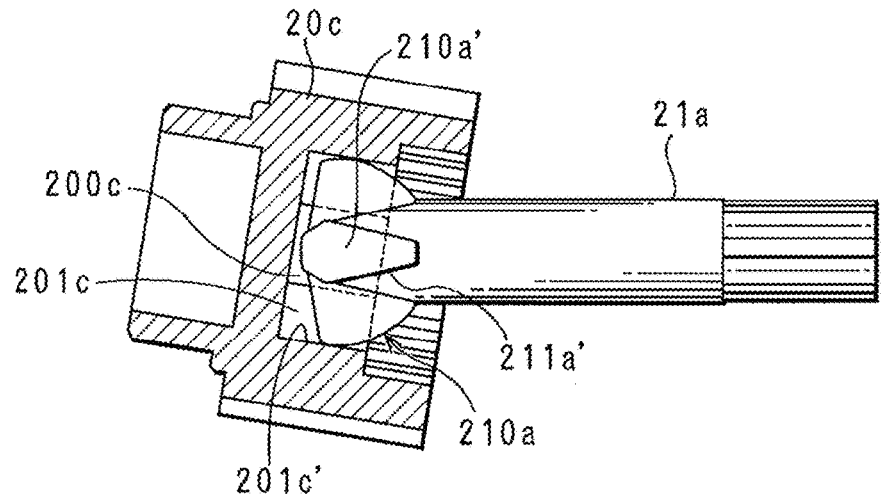
FIG. 16(a) is a partial cross-sectional view showing a state where the first transmission gear pivots in a clockwise direction in a plan view while maintaining an engagement with an output shaft of the motor.
FIG. 16(b) is a partial cross-sectional view showing a state where the first transmission gear vertically engages with the output shaft of the motor.
FIG. 16(c) is a partial cross-sectional view showing a state where the first transmission gear pivots in a counterclockwise direction in a plan view while maintaining the engagement with the output shaft of the motor.
Figure 16:
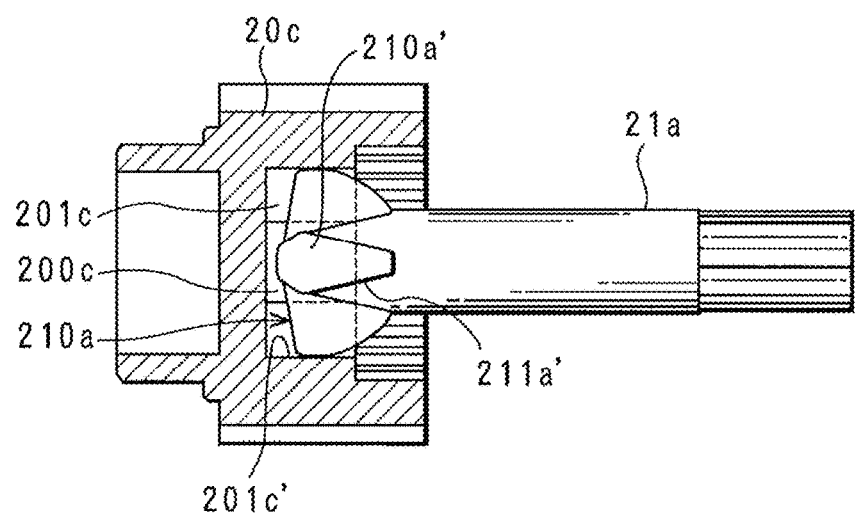
Figure 16:
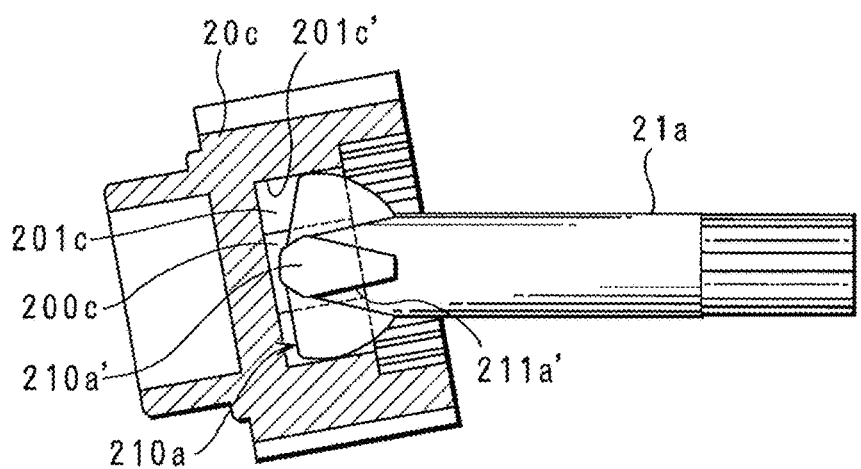

As shown in FIG. 14(a), (b), FIG. 15(a), (b), FIG. 16(a) to (c), a peripheral surface of a tip portion of the output shaft 21a of the motor 2a, the tip portion being inserted into the first transmission gear 20c, is provided with a plurality of protrusions 210a at equal intervals, the protrusions 210a protruding in a diameter direction of the output shaft 21a and elongating along an axis of the output shaft. In the shown example, four pieces of protrusions 210a each of which is formed in a fan-like shape in a side view are arranged in a cross-shaped pattern in a front view. The first transmission gear 20c is provided with a cross-shaped engaging hole 200c which can house the tip portion of the output shaft 21a of the motor 2a provided with these protrusions 210a and which can engage with the tip portion of the output shaft 21a in both forward and reverse rotation directions of the output shaft 21a.

The engaging hole 200c is provided with the same number of engaging grooves 200c' as the protrusions 210a for engaging with the protrusions 210a respectively, the engaging grooves 200c' respectively having a U-shaped cross section. The protrusions 210a are respectively inserted into the engaging grooves 200c' elongating along an axial direction of the first transmission gear 20c with play in both rotation directions. Even when the output shaft 21a rotates in either the forward direction or the reverse direction, at least a part of a side portion 211a' in a rotation progressing direction of each of the protrusions 210a comes into contact with an facing side wall 201c″ of each of the engaging grooves 200c′, and it is possible to rotate the first transmission gear 20c.

As shown in FIG. 16(b), in a side view, each peripheral portion 210a′ of the fan-like shaped protrusions 210a protrudes the most at a tip side of the output shaft 21a, each inner peripheral wall 201c′ of the engaging holes 200c respectively facing the peripheral portions 210a′ elongates along an axis direction of the first transmission gear 20c, and when the output shaft 21a is inserted vertically into the engaging hole 200c, the most protruding portion of the peripheral portion 210a′ of the respective protrusions 210a is in contact with the facing inner peripheral wall 201c′ of the respective engaging holes 200c.

In a side view, the peripheral portion 210a′ of each of the fan-like shaped protrusions 210a is formed to have a curved surface (curved surface relative to the axial direction of the output shaft 21a) of which a protruding height gradually decreases from the most protruding portion on the tip side of the output shaft 21a toward a base end side of the output shaft 21a, and the inner peripheral walls 201c′ of the respective engaging holes 200c respectively facing the peripheral portions 210a′ elongates along the axis direction of the first transmission gear 20c. In a plan view, each of the fan-like shaped protrusions 210a is formed to be widest at the most protruding portion, both of the side portions 211a′, 211a′ are inclined so as to gradually become thinner from the widest portion toward the base end side of the output shaft 21a, and the side walls 201c″, 201c″ of the engaging hole 200c respectively facing both of the side portions 211a′, 211a′ elongate along the axis direction of the first transmission gear 20c.

Thus, as shown in FIG. 16(a) to (c), the first transmission gear 20c can pivot with respect to the output shaft 21a such that an engagement angle of the first transmission gear 20c to the output shaft 21a changes. During this pivoting, the peripheral portions 210a′ of the respective protrusions 210a are respectively in contact with the inner peripheral walls 201c′ of the respective engaging holes 200c. Since the peripheral portions 210a′ of the respective protrusions 210a are respectively in contact with the inner peripheral walls 201c′ of the respective engaging holes 200c, it is capable of prohibiting looseness during driving.

The engaging grooves 200c′ of the engaging hole 200c are formed to have a width and a length to be capable of engaging with the protrusions 210a such that when the first transmission gear 20c pivots with respect to the output shaft 21a as described above, at least a part of the side portion 211a′ in a rotation progressing direction of each of the protrusions 210a, mainly a corner of the side portion 211a′ at a widest portion comes into contact with the facing side wall 201c″ of the respective engaging grooves 200c′ to rotate the first transmission gear 20c.

Thus, as shown in FIG. 13, FIG. 17(a), (b), it is capable of making the conversion-mechanism support body 2d supported to the casing 2e by the pivoting shaft in the vehicle vertical direction pivot with respect to the casing 2e along the above-described vehicle horizontal plane together with the conversion mechanism 2c and the coupling mechanism 3, and transmitting the driving force of the motor 2a to the coupling mechanism 3 via the conversion mechanism 2c.

As long as the driving force of the motor 2a can be transmitted to the coupling mechanism 3 even when the conversion-mechanism support body 2d pivots with respect to the casing 2e, the number and the shape of the protrusions 210a formed on the peripheral surface of the tip portion of the output shaft 21a of the motor 2a, and the shape of the engaging hole 200c of the first transmission gear 20c corresponding to the number and the shape of the protrusions 210a are not limited to those shown in the drawings.

There is described the opening/closing of the door 6 by a vehicle-opening/closing-body driving device (side door opening/closing device) 1 of the present invention. As described below, although the lead screw 30 swings around the coupling shaft 32 according to the opening/closing operation of the side door 6, a rotation center of the side door 6 (a rotation center of the hinge shaft 50c of a door hinge 50) and a rotation center of the lead screw 30 (a rotation center of the coupling shaft 32) are eccentric each other in the vehicle interior and exterior direction (see FIGS. 3, 4). Thus, the engagement angle of the first transmission gear 20c with respect to the output shaft 21a of the motor 2a changes as shown in FIG. 16(a) to (c), and the coupling mechanism 3 pivots with respect to the casing 2e along the plane parallel to the pivoting locus plane P of the side door 6 (the vehicle horizontal plane in the shown example). For example, in a closed state of the side door 6 shown in FIG. 3, the lead screw 30 is drawn into the driving assembly 2 to its front-end portion (see FIG. 17(a)), the axis L2 of the lead screw 30 is inclined in a clockwise direction by an angle of several degrees with respect to the axis L1 of the output shaft 21a of the motor 2a in a plan view, and the coupling mechanism 3 is in a state of slightly pivoting in the clockwise direction with respect to the casing 2e in the plan view. From this state, when the lead screw 30 is pushed out from the driving assembly 2 to the front-end side (door opening direction) to move with respect to the driving assembly 2 according to the forward rotation of the first transmission gear 20c by the driving of the motor 2a, the side door 6 swings in the opening direction around the hinge shaft 50c of the door hinge 50 and finally operates to open to a fully open position shown in FIG. 4. According to this, the lead screw 30 swings in the clockwise direction around the coupling shaft 32 in the plan view, and pivots in a counterclockwise direction with respect to the casing 2e in the plan view.

When the side door 6 reaches the fully open position, the movable member 50b of the door hinge 50 comes into contact with a stopper of the fixing member 50a and/or the stopper 34 fixed to the lead screw 30 comes into contact with a rear surface of the rear casing 21e, thereby prohibiting the side door 6 from further movement in the opening direction.

In the fully opened state of the side door 6 shown in FIG. 4, the lead screw 30 is pushed out from the driving assembly 2 until the stopper 34 substantially comes into contact with the rear surface of the rear casing 21e, the axis L2 of the lead screw 30 is inclined in the counterclockwise direction by an angle of dozen degrees with respect to the axis L1 of the output shaft 21a of the motor 2a in the plan view (see FIG. 17(b)), and the coupling mechanism 3 is in a state of pivoting in the counterclockwise direction with respect to the casing 2e in the plan view. From this state, when the lead screw 30 is drawn to the driving assembly 2 side (door closing direction) to move with respect to the driving assembly 2 according to the reverse rotation of the first transmission gear 20c by the driving of the motor 2a, the side door 6 swings in the closing direction around the hinge shaft 50c of the door hinge 50 and finally operates to close to the closed position shown in FIG. 3. According to this, the lead screw 30 swings in the counterclockwise direction around the coupling shaft 32 in the plan view, and pivots in the clockwise direction with respect to the casing 2e in the plan view.

When the side door 6 reaches the closed position, the door latch device 8 engages with a striker on the vehicle body 5 side to hold the side door 6 in the closed position. In the case of using a brushless motor, when two-phase energization (energizing only armature coils of two phases) is performed by fixing the energized phases, the motor torque is reduced and a holding force against the side door 6 occurs. Thus, the function of a conventional door check link can be supplemented by a brushless motor, and a door check link can be omitted.

When the side door 6 moves to open from the closed position, the side door 6 may open unexpectedly and rapidly due to an inclination in the front and rear direction of the vehicle 4 or influence of a strong wind. As a countermeasure, when the side door 6 moves to a predetermined half-open position, it is preferable to suppress the side door 6 from rapidly opening beyond the predetermined half-open position by applying a braking resistance to the side door 6 by performing the two-phase energization with fixing energizing phases to the motor 2a consisting of a brushless motor as described above. The predetermined half-open position of the side door 6 is preferably about 10 degrees as the open angle and is detected by the angular velocity sensor 6B provided on the side door 6.

The following is an example in which the vehicle-opening/closing-body driving device of the present invention is applied as a device for opening and closing a back door of a vehicle, based on the drawings. Incidentally, the same reference signs are given to the same members as those of the side door opening/closing device, and differences between the back door opening/closing device and the side door opening/closing device are mainly described, and detailed description of common points between the two devices is omitted.

Figure 18:
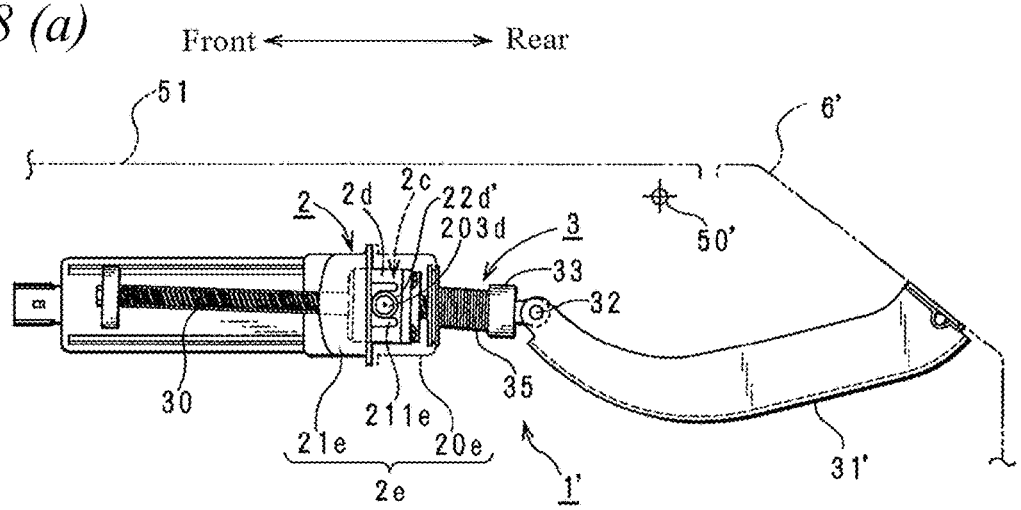
FIG. 18(a) is a side view showing a back door opening/closing device when a back door is in a closed state.
FIG. 18(b) is a side view showing the back door opening/closing device when the back door is in a fully opened state.
Figure 18:
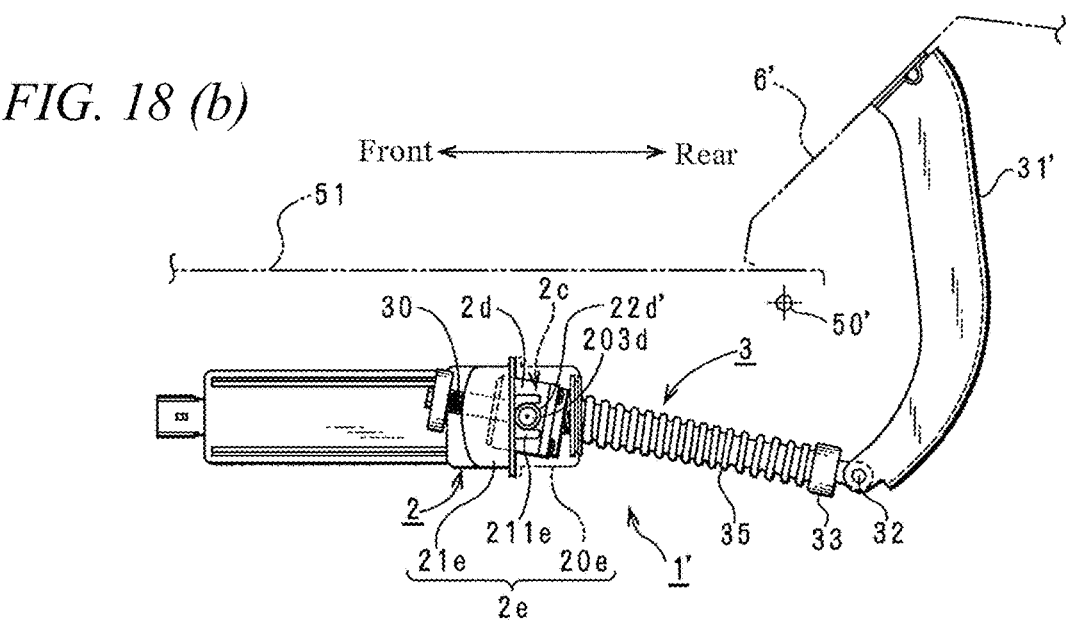

As shown in FIG. 18(*a*), (*b*), a back door opening/closing device 1' is different from the side door opening/closing device 1 mainly in that the driving assembly 2 is arranged inside a roof panel 51 which is a part of the vehicle body 5, and in that the coupling mechanism 3 couples a back door 6' which is the opening/closing body with the driving assembly 2. The back door 6' is pivotably supported in the vehicle vertical direction by a hinge shaft 50' of a door hinge (not shown) oriented in a vehicle lateral direction. The back door opening/closing device 1' is supported on the roof panel 51 via a support bracket not shown.

The coupling mechanism 3 has a coupling link 31' alternative to the vehicle body side bracket 31, a front-end portion of the coupling link 31' is pivotably coupled with the lead screw 30 and a rear-end portion of the coupling link 31' is fixed to the back door 6'. The lead screw 30 extends in a direction parallel to a pivoting locus plane of the back door 6' (a plane including the pivoting locus and parallel to the paper surface in FIG. 18(*a*), (*b*)) inside the roof panel 51. A rear-end portion of the lead screw 30 is inserted through an aperture (not shown) formed on the vehicle body 5 to protrude rearward, and is pivotably coupled with the coupling link 31' along a plane parallel to the pivoting locus plane of the back door 6' by the coupling shaft 32 oriented in the vehicle lateral direction.

The driving assembly 2 of the back door opening/closing device 1' is different from that of the side door opening/closing device 1 in that the casing 2e is fixed to the roof panel 51 of the vehicle body 5, and in that the conversion-mechanism support body 2d is supported in the casing 2e by a pivoting shaft in a direction perpendicular to the pivoting locus plane of the back door 6', thereby enabling the coupling mechanism 3 to pivot with respect to the casing 2e along the plane parallel to the pivoting locus plane of the back door 6' (a vehicle vertical plane in the shown example).

As described above, since the conversion-mechanism support body 2d is supported by the pivoting shaft in the vehicle lateral direction, the first to third transmission gears 20c, 21c, 22c are linearly arranged along the axis L3 of the pivoting shaft in the vehicle lateral direction.

The axis L1 of the output shaft 21a of the motor 2a and the axis L2 of the coupling mechanism 3 are parallel (parallel in a plan view of the vehicle in the shown example) on a vertical plane perpendicular to the pivoting locus plane of the back door 6' (a plane perpendicular to the paper surface and elongating in a horizontal direction in FIG. 18(*a*), (*b*)). That is, the output shaft 21a of the motor 2a and the coupling mechanism 3 are arranged to be parallel on the vertical plane perpendicular to the pivoting locus plane of the back door 6' (parallel in the plan view of the vehicle).

Incidentally, the back door 6' is provided with an outside handle (not shown), and it is preferable to provide a capacitance sensor capable of detecting contact or approach of a user's hand on or near the outside handle. Moreover, the back door 6' is preferably provided with an angular velocity sensor detecting an opening angle thereof. Suitably, the angular velocity sensor is arranged on a pivoting end portion (lower-end portion) of the back door 6'. Respective detection signals of the capacitance sensor and the angular velocity sensor are transmitted to the above-described control unit (not shown). The control unit controls the motor 2a of the driving assembly 2 based on each of the detection signals received.

There is described the opening/closing of the back door 6' by the back door opening/closing device 1'. As described below, although the lead screw 30 swings around the pivoting shaft supporting the conversion-mechanism support body 2d according to the opening/closing operation of the back door 6', a rotation center of the back door 6' (a rotation center of the hinge shaft 50') and a rotation center of the lead screw 30 (a rotation center of the pivoting shaft supporting the conversion-mechanism support body 2d) are eccentric each other in the vehicle interior and exterior direction (see FIG. 18(*a*), (*b*)). Thus, the engagement angle of the first transmission gear 20c with respect to the output shaft 21a of the motor 2a changes (see FIG. 16(*a*) to (*c*)), and the coupling mechanism 3 pivots with respect to the casing 2e along the plane parallel to the pivoting locus plane P of the back door 6' (the vehicle vertical plane in the shown example). For example, in a closed state of the back door 6' shown in FIG. 18(*a*), the lead screw 30 is drawn into the driving assembly 2 to its rear-end portion, and the coupling mechanism 3 is in a state of slightly pivoting in a clockwise direction with respect to the casing 2e in a side view. From this state, when the lead screw 30 is pushed out from the driving assembly 2 to the rear-end side (door opening direction) to move with respect to the driving assembly 2 according to the forward rotation of the first transmission gear 20c by the driving of the motor 2a, the back door 6' swings in the opening direction around the hinge shaft 50' and finally operates to open to a fully open position shown in FIG. 18(*b*). According to this, the lead screw 30 pivots in the clockwise direction with respect to the casing 2e in the plan view.

When the back door 6' reaches the fully open position, a movable member not shown of the door hinge comes into contact with a stopper of a fixing member and/or the stopper 34 fixed to the lead screw 30 comes into contact with a front surface of the rear casing 21e, thereby prohibiting the back door 6' from further movement in the opening direction.

In a fully opened state of the back door 6' shown in FIG. 18(*b*), the lead screw 30 is pushed out from the driving assembly 2 until the stopper 34 substantially comes into contact with the front surface of the casing 2e, and the coupling mechanism 3 is in a state of pivoting in the clockwise direction with respect to the casing 2e in the side view. From this state, when the lead screw 30 is drawn to the driving assembly 2 side (door closing direction) to move with respect to the driving assembly 2 according to the reverse rotation of the first transmission gear 20c by the driving of the motor 2a, the back door 6' swings in a closing direction around the hinge shaft 50' and finally operates to close to the closed position shown in FIG. 18(*a*). According to this, the lead screw 30 pivots in a counterclockwise direction with respect to the casing 2e in the side view.

When the back door 6' reaches the closed position, a door latch device (not shown) provided on the back door 6' engages with a striker on the vehicle body 5 side to hold the back door 6' in the closed position. As described above, in the case of using a brushless motor as the motor 2a, when two-phase energization is performed by fixing the energized phases, a holding force against the back door 6' occurs. Thus, the function of a conventional door check link can be supplemented by a brushless motor, and a door check link can be omitted. Moreover, as described above, when the back door 6' moves to a predetermined half-open position, it is preferable to suppress the back door 6' from rapidly opening beyond the predetermined half-open position by applying a braking resistance to the back door 6' by performing the two-phase energization with fixing energizing phases to the motor 2a consisting of a brushless motor.

In view of the above, the vehicle-opening/closing-body driving device (the side door opening/closing device 1, the back door opening/closing device 1') of the present invention has the following advantages (1) to (7).

(1) Since the output shaft 21a of the driving actuator (motor) 2a and the coupling mechanism (lead screw) 3 are arranged to be always parallel on the vertical plane perpendicular to the pivoting locus plane of the opening/closing body (door) 6, 6' (see FIG. 7), the transmission efficiency of the driving force of the driving actuator 2a is high.

(2) Since the coupling mechanism 3 is supported inside the casing 2e by the pivoting shaft in the direction perpendicular to the pivoting locus plane of the opening/closing body (door) 6, 6' (see FIG. 13) such that only the coupling mechanism 3 can pivot with respect to the casing 2e, it is possible to simplify the structure and to provide the vehicle-opening/closing-body driving device having excellent layout properties.

(3) The output shaft 21a of the driving actuator 2a and the transmission member (the first transmission gear 20c) which engages with the output shaft 21a of the driving actuator 2a to rotate and transmits the driving force of the driving actuator 2a to the coupling mechanism 3 are coupled by a joint structure in which the engagement angle is variable such that even when the coupling mechanism 3 pivots with respect to the casing 2e, it is capable of transmitting the driving force of the driving actuator 2a to the coupling mechanism 3. Therefore, the vehicle-opening/closing-body driving device has excellent layout properties and can surely transmit the driving force of the driving actuator 2a to the coupling mechanism 3.

(4) The coupling mechanism 3 is configured by the lead screw, the above-described transmission member configures the conversion mechanism 2c which converts the direction of the driving force within the direction parallel to the pivoting locus plane of the opening/closing body (door) 6, 6' when the driving force is transmitted to the coupling mechanism 3, and the first and second transmission members 20c, 21c configuring the conversion mechanism 2c are linearly arranged by the pivoting shaft in the vertical direction perpendicular to the pivoting locus plane of the opening/closing body (door) 6, 6'. Therefore, the casing 2e can be arranged close to the mounting surface of the door 6, thereby providing the vehicle-opening/closing-body driving device having excellent layout properties.

(5) Since the above-described conversion mechanism 2c is pivotably supported inside the casing 2e by the pivoting shaft in the vertical direction perpendicular to the pivoting locus plane of the opening/closing body (door) 6, 6' (see FIG. 13), it is possible to provide the vehicle-opening/closing-body driving device that has no restrictions on installation location and provides reliable operation.

(6) Since the above-described conversion mechanism 2c is pivotably supported inside the casing 2e along the plane parallel to the pivoting locus plane of the opening/closing body (door) 6, 6', it is possible to reduce the respective sizes of the apertures 200e, 210e to the minimum necessary, wherein the apertures 200e, 210e are formed on the casing 2e in the direction perpendicular to the pivoting shaft which is in the direction perpendicular to the pivoting locus plane of the opening/closing body (door) 6, 6' to allow the coupling mechanism 3 to pivot. Thus, the size of the device can be reduced. Water ingress through the aperture 200e formed on the front casing 20e can also be minimized.

(7) Since the lead screw 30 is covered with the cylindrical tube 35 from the coupling part 33 by which the lead screw 30 is coupled with the vehicle body 5 to the aperture 200e of the front casing 20e, regardless of the position of the opening/closing body (door) 6, 6', water ingress can be surely prevented, and the performance of the device can be maintained over a long period of time.

Although the vehicle-opening/closing-body driving device of the present invention has been described above as a side door opening/closing device and a back door opening/closing device of a vehicle, the vehicle-opening/closing-body driving device of the present invention can be also applied as a device for opening/closing a hood (bonnet). In such a case, the drive assembly 2 is preferably disposed on the vehicle body side in the same manner as the back door opening/closing device 1'.

What is claimed is:

1. A vehicle-opening/closing-body driving device to drive an opening/closing body pivotably supported to a vehicle body, comprising:
   a driving assembly provided in either one of the opening/closing body and the vehicle body to have a driving actuator;
   a casing fixed in the opening/closing body or the vehicle body in which the driving assembly is provided to house the driving assembly; and
   a coupling mechanism coupling the driving assembly and the other of the opening/closing body or the vehicle body, which is inserted through the casing in a direction parallel to a pivoting locus plane of the opening/closing body such that one end portion of the coupling mechanism is protruded from the opening/closing body or the vehicle body in which the casing is fixed to be pivotably supported to the other of the opening/closing body or the vehicle body and the other end portion of the coupling mechanism is inserted into an inside of the opening/closing body or the vehicle body to which the casing is fixed, the coupling mechanism driving the opening/closing body to open and close with a driving force of the driving actuator by being pushed toward a side of the one end portion relative to the casing and by being retracted toward a side of the other end portion relative to the casing, wherein an output shaft of the driving actuator and the coupling mechanism are arranged to be parallel on a plane perpendicular to the pivoting locus plane, wherein the coupling mechanism is pivotably supported in the casing by a pivoting shaft in a direction perpendicular to the pivoting locus plane to pivot with respect to the casing accompanied with the opening/closing operation of the opening/closing body, and wherein the vehicle-opening/closing-body driving device further comprises a transmission member which is arranged in the casing and is rotated with the driving actuator by engaging with the output shaft of the driving actuator to transmit the driving force of the driving actuator to the coupling and wherein the output shaft and the transmission member are coupled with a joint structure in which an engagement angle is variable.

2. The vehicle-opening/closing-body driving device according to claim 1, wherein a peripheral surface of a tip portion of the output shaft of the driving actuator is provided with a plurality of protrusions elongating along an axis of the output shaft, the transmission member is provided with an engaging hole having a plurality of engaging grooves of U-shaped cross section respectively engaging with the protrusions of the output shaft, and each side surface of the protrusions in a rotation progression direction contacts with each facing side wall of the engagement grooves to rotate the transmission member, wherein a peripheral portion of each of the protrusions is formed to have a curved surface of which a protruding height gradually decreases from the most protruding portion on a tip side of the output shaft toward a base end side of the output shaft in a side view, inner peripheral walls of the engaging hole respectively facing the peripheral portions elongate along an axis direction of the transmission member, and therefore the transmission member pivots with respect to the output shaft such that the engagement angle against the output shaft varies, even during this pivot, at least a part of the respective side surfaces of the protrusions in the rotation progression direction contact with the respective facing side walls of the engagement grooves to rotate the transmission member, and thereby coupling the output shaft with the transmission member by the joint structure in which the engagement angle is variable, and the transmission member transmits the driving force of the driving actuator to the coupling mechanism in both forward and reverse rotation directions of the output shaft while pivoting with respect to the output shaft.

3. The vehicle-opening/closing-body driving device according to claim 2, wherein the coupling mechanism comprises a lead screw which is inserted through the casing in the direction parallel to the pivoting locus plane of the opening/closing body such that one end portion of the lead screw is protruded from the opening/closing body or the vehicle body in which the casing is fixed to be pivotably supported to the other of the opening/closing body or the vehicle body and the other end portion of the lead screw is inserted into the inside of the opening/closing body or the vehicle body to which the casing is fixed, the lead screw moving the opening/closing body in an opening direction with the driving force of the driving actuator by being pushed toward a side of the one end portion relative to the casing and moving the opening/closing body in a closing direction by being retracted toward a side of the other end portion relative to the casing, wherein the transmission member comprises a first transmission member engaging with the output shaft of the driving actuator to be rotated by the driving actuator and a second transmission member which is mounted on the lead screw to transmit rotation of the first transmission member to the lead screw, the first transmission member and the output shaft are coupled with the joint structure, and therefore the transmission member configures a conversion mechanism which converts a direction of the driving force within the direction parallel to the pivoting locus plane of the opening/closing body when the transmission member transmits the driving force to the coupling mechanism, and wherein the first and second transmission members configuring the conversion mechanism are linearly arranged along the pivoting shaft in the direction perpendicular to the pivoting locus plane.

4. The vehicle-opening/closing-body driving device according to claim 3, wherein the conversion mechanism is pivotably supported by the pivoting shaft in the direction perpendicular to the pivoting locus plane of the opening/closing body, and pivots with respect to the casing with the coupling mechanism accompanied with the pivot of the coupling mechanism.

5. The vehicle-opening/closing-body driving device according to claim 4, wherein the first and second transmission members are housed in a support body which is pivotably supported by the pivoting shaft in the direction perpendicular to the pivoting locus plane of the opening/closing body in the casing, each of the first and second transmission members is rotatably supported to the support body to be linearly arranged along the pivoting shaft in the perpendicular direction, and the lead screw is inserted through the support body in the direction parallel to the pivoting locus plane and is supported to the support body via the second transmission member mounted on the lead screw.

6. The vehicle-opening/closing-body driving device according to claim 2, wherein on each surface of the casing in the one end portion side and the other end portion side of the coupling mechanism, an aperture through which the coupling mechanism is inserted to pivot is formed in the direction perpendicular to the pivoting shaft perpendicular to the pivoting locus plane of the opening/closing body.

7. The vehicle-opening/closing-body driving device according to claim 6, wherein the coupling mechanism comprises a lead screw which is inserted through the casing in the direction parallel to the pivoting locus plane of the opening/closing body such that one end portion of the lead screw is protruded from the opening/closing body or the vehicle body in which the casing is fixed to be pivotably supported to the other of the opening/closing body or the vehicle body and the other end portion of the lead screw is inserted into the inside of the opening/closing body or the vehicle body to which the casing is fixed, the lead screw moving the opening/closing body in an opening direction with the driving force of the driving actuator by being pushed toward a side of the one end portion relative to the casing and moving the opening/closing body in a closing direction by being retracted toward a side of the other end portion relative to the casing, and wherein the lead screw is covered with a cylindrical tube from a coupling part which couples the coupling mechanism with the other of the opening/closing body or the vehicle body to the aperture on the surface of the casing in the one end portion side of the lead screw.

8. The vehicle-opening/closing-body driving device according to claim 1,
wherein the coupling mechanism comprises a lead screw which is inserted through the casing in the direction parallel to the pivoting locus plane of the opening/closing body such that one end portion of the lead screw is protruded from the opening/closing body or the vehicle body in which the casing is fixed to be pivotably supported to the other of the opening/closing body or the vehicle body and the other end portion of the lead screw is inserted into the inside of the opening/closing body or the vehicle body to which the casing is fixed, the lead screw moving the opening/closing body in an opening direction with the driving force of the driving actuator by being pushed toward a side of the one end portion relative to the casing and moving the opening/closing body in a closing direction by being retracted toward a side of the other end portion relative to the casing,
wherein the transmission member comprises a first transmission member engaging with the output shaft of the driving actuator to be rotated by the driving actuator and a second transmission member which is mounted on the lead screw to transmit rotation of the first transmission member to the lead screw, the first transmission member and the output shaft are coupled with the joint structure, and therefore the transmission member configures a conversion mechanism which converts a direction of the driving force within the direction parallel to the pivoting locus plane of the opening/closing body when the transmission member transmits the driving force to the coupling mechanism, and
wherein the first and second transmission members configuring the conversion mechanism are linearly arranged along the pivoting shaft in the direction perpendicular to the pivoting locus plane.

9. The vehicle-opening/closing-body driving device according to claim 8, wherein the conversion mechanism is pivotably supported by the pivoting shaft in the direction perpendicular to the pivoting locus plane of the opening/closing body, and pivots with respect to the casing with the coupling mechanism accompanied with the pivot of the coupling mechanism.

10. The vehicle-opening/closing-body driving device according to claim 9, wherein the first and second transmission members are housed in a support body which is pivotably supported by the pivoting shaft in the direction perpendicular to the pivoting locus plane of the opening/closing body in the casing, each of the first and second transmission members is rotatably supported to the support body to be linearly arranged along the pivoting shaft in the perpendicular direction, and the lead screw is inserted through the support body in the direction parallel to the pivoting locus plane and is supported to the support body via the second transmission member mounted on the lead screw.

11. The vehicle-opening/closing-body driving device according to claim 1, wherein on each surface of the casing in the one end portion side and the other end portion side of the coupling mechanism, an aperture through which the coupling mechanism is inserted to pivot is formed in the direction perpendicular to the pivoting shaft perpendicular to the pivoting locus plane of the opening/closing body.

12. The vehicle-opening/closing-body driving device according to claim 11, wherein the coupling mechanism comprises a lead screw which is inserted through the casing in the direction parallel to the pivoting locus plane of the opening/closing body such that one end portion of the lead screw is protruded from the opening/closing body or the vehicle body in which the casing is fixed to be pivotably supported to the other of the opening/closing body or the vehicle body and the other end portion of the lead screw is inserted into the inside of the opening/closing body or the vehicle body to which the casing is fixed, the lead screw moving the opening/closing body in an opening direction with the driving 41 the driving actuator by being pushed toward a side of the one end portion relative to the casing and moving the opening/closing body in a closing direction by being retracted toward a side of the other end portion relative to the casing, and wherein the lead screw is covered with a cylindrical tube from a coupling part which couples the coupling mechanism with the other of the opening/closing body or the vehicle body to the aperture on the surface of the casing in the one end portion side of the lead screw.

* * * * *